(12) United States Patent
Maeda

(10) Patent No.: US 11,940,426 B2
(45) Date of Patent: Mar. 26, 2024

(54) CHROMATOGRAPH MASS SPECTROMETER

(71) Applicant: SHIMADZU CORPORATION, Kyoto (JP)

(72) Inventor: Kazuma Maeda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 359 days.

(21) Appl. No.: 17/437,263

(22) PCT Filed: Mar. 27, 2019

(86) PCT No.: PCT/JP2019/013228
§ 371 (c)(1),
(2) Date: Sep. 8, 2021

(87) PCT Pub. No.: WO2020/194582
PCT Pub. Date: Oct. 1, 2020

(65) Prior Publication Data
US 2022/0178888 A1    Jun. 9, 2022

(51) Int. Cl.
*G01N 30/72*    (2006.01)
*G01N 27/70*    (2006.01)

(52) U.S. Cl.
CPC ......... *G01N 30/7213* (2013.01); *G01N 27/70* (2013.01); *G01N 30/7293* (2013.01)

(58) Field of Classification Search
CPC ........... G01N 30/7213; G01N 30/7293; G01N 30/74; G01N 30/72; G01N 30/86; G01N 27/70

(Continued)

(56) References Cited

U.S. PATENT DOCUMENTS

2011/0125416 A1    5/2011    Noda et al.
2011/0184658 A1    7/2011    Maruyama
(Continued)

FOREIGN PATENT DOCUMENTS

CN    102057271 A    5/2011
CN    102124329 A    7/2011
(Continued)

OTHER PUBLICATIONS

Decision to Grant a Patent dated Oct. 4, 2022 from the Japanese Patent Office in Japanese Application No. 2021-508532.

(Continued)

*Primary Examiner* — Kiet T Nguyen
(74) *Attorney, Agent, or Firm* — Sughrue Mion, PLLC

(57) ABSTRACT

Provided is a chromatograph mass spectrometer that includes a component separation unit 13 that temporally separates components in a sample, a first detector 15 that acquires measurement data of components included in an outflowing liquid from the component separation unit 13 by an analysis method different from mass spectrometry, a mass spectrometer 2 that acquires mass spectrometry data including intensity information for each of mass-to-charge ratios of ions derived from the components contained in the outflowing liquid from the component separation unit 13, a chromatogram creation unit 45 that creates a chromatogram representing an intensity change of the measurement data with time based on the measurement data of the first detector 15, an information extraction unit 46 that detects a peak based on the intensity change of the mass spectrometry data with time, and extracts information including a representative time of the peak, and a chromatogram display unit 48 that displays the chromatogram together with additional information corresponding to the extracted time.

17 Claims, 10 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 2015/0198569 A1 | 7/2015 | Baba et al. | |
| 2016/0202219 A1 | 7/2016 | Sakamoto | |
| 2016/0290976 A1* | 10/2016 | Okoba | G01N 30/8651 |
| 2018/0313794 A1 | 11/2018 | Yamamoto et al. | |
| 2019/0170712 A1* | 6/2019 | Ueda | G01N 30/8679 |
| 2019/0277817 A1 | 9/2019 | Yamaguchi | |
| 2020/0035479 A1 | 1/2020 | Yasuda | |
| 2020/0309748 A1 | 10/2020 | Kudo | |
| 2021/0293763 A1* | 9/2021 | Fujita | G01N 30/8631 |
| 2022/0178888 A1 | 6/2022 | Maeda | |

FOREIGN PATENT DOCUMENTS

| | | |
|---|---|---|
| CN | 105518448 A | 4/2016 |
| CN | 108369209 A | 8/2018 |
| CN | 109477814 A | 3/2019 |
| EP | 2 295 958 A1 | 3/2011 |
| EP | 3 364 185 A1 | 8/2018 |
| JP | 2001-165922 A | 6/2001 |
| JP | 2014-219317 A | 11/2014 |
| JP | WO2020/194582 A1 | 10/2020 |
| WO | 2009/147699 A1 | 12/2009 |
| WO | 2014/017278 A1 | 1/2014 |
| WO | 2017/064783 A1 | 4/2017 |
| WO | 2018/087824 A1 | 5/2018 |
| WO | 2018/173223 A1 | 9/2018 |

OTHER PUBLICATIONS

Office Action dated May 10, 2022 issued by the Japanese Patent Office in Japanese Application No. 2021-508532.
Japanese Office Action dated Aug. 15, 2023 in Application No. 2022-168369.
International Search Report for PCT/JP2019/013228 dated Jun. 25, 2019 (PCT/ISA/210).
Written Opinion for PCT/JP2019/013228 dated Jun. 25, 2019 (PCT/ISA/237).
Communication dated Dec. 28, 2023 issued by the State Intellectual Property Office of the P.R.China in application No. 201980085345. 2.

* cited by examiner

CHROMATOGRAPH MASS SPECTROMETER

TECHNICAL FIELD

The present invention relates to a chromatograph mass spectrometer.

BACKGROUND ART

Liquid chromatographs are widely used to identify and quantify components in a sample. In a liquid chromatograph, components in the sample are separated by a column, and then each component is detected.

A liquid chromatograph including an ultraviolet-visible absorbance detector (UV detector) is often used to measure components in a sample solution eluted from the column. In the liquid chromatograph including the UV detector, a temporal change in a light absorption amount by the sample solution is measured by letting the sample solution eluted from the column flow into a measurement cell and irradiating the sample solution with ultraviolet light having a predetermined wavelength. After the measurement is completed, a chromatogram is obtained by graphing the temporal change of the light absorption amount. Every component is identified based on the position (retention time) of a peak in the chromatogram (qualitative analysis), and the component is quantified based on the area or height of the peak. Since highly reproducible measurement can be performed in the UV detector, known components can be accurately quantified.

A mass spectrometer may be used as the detector of the liquid chromatograph. The liquid chromatograph including the mass spectrometer is called a liquid chromatograph mass spectrometer. In the liquid chromatograph mass spectrometer, the components contained in the sample solution eluted from the column are ionized, and the intensities of the ions are measured for each mass-to-charge ratio. In the liquid chromatograph mass spectrometer, scan measurement is performed by a mass spectrometer, and thus, three-dimensional data representing the intensities of the ions with respect to two axes of a retention time and a mass-to-charge ratio is obtained. Since this three-dimensional data includes information on a mass spectrum (mass-to-charge ratio to ion intensity), it is possible to perform highly accurate identification (qualitative analysis) of the components included in the sample to be analyzed based on detection of characteristic ions of each component.

Patent Literature 1 describes the liquid chromatograph mass spectrometer including both the UV detector and the mass spectrometer. In this liquid chromatograph mass spectrometer, the sample solution eluted from the column is made to flow into the UV detector, and when the components are detected by the UV detector, the sample solution flowing out of the UV detector is continuously measured by the mass spectrometer. The mass spectrometer repeatedly performs scan measurement at short time intervals, and thus, mass spectra are acquired at the short time intervals. The chromatogram is created based on the measurement data of the UV detector. The component corresponding to a peak is identified by referring to a compound database prepared in advance based on the mass spectrum acquired at the time of the peak of the chromatogram (or the vicinity of the peak). The chromatogram created based on the measurement data of the UV detector is displayed on a screen together with the name of the component corresponding to each peak identified in this manner.

CITATION LIST

Patent Literature

Patent Literature 1: JP 2001-165922 A

SUMMARY OF INVENTION

Technical Problem

When the liquid chromatograph mass spectrometer described in Patent Literature 1 is used, information on the component corresponding to each peak is displayed on a highly reproducible chromatogram created based on the measurement data of the UV detector, and thus, even a person not skilled in the art can easily identify and quantify the components in the sample with high accuracy.

However, some component contained in a sample may not absorb ultraviolet light or may absorb little amount of ultraviolet light. Since the liquid chromatograph mass spectrometer described in Patent Literature 1 performs the mass spectrometry with the detection of the component by the UV detector as a trigger, the component not detected by the UV detector is not measured by the mass spectrometer, and thus, there is a problem that the component is overlooked though the sample actually contains it.

On the other hand, when the measurement using the UV detector and the measurement using the mass spectrometer are individually performed, the component not detected by the UV detector can be detected by the mass spectrometer. But in that case, the user needs to carefully read complicated data acquired by the mass spectrometer, and such data reading work is burdensome particularly for a user unfamiliar with the mass spectrometer.

The problem of the related art has been described by taking the liquid chromatograph mass spectrometer including the UV detector and the mass spectrometer as an example, but liquid chromatograph mass spectrometers and gas chromatograph mass spectrometers including other detectors and mass spectrometers also have the same problem described above.

An object of the present invention is to provide a chromatograph mass spectrometer that allows a user to easily identify components that are difficult to be detected by a method different from mass spectrometry without an intensive work of reading complicated data acquired by a mass spectrometer.

Solution to Problem

A chromatograph mass spectrometer according to the present invention made in order to solve the problems includes
  a component separation unit configured to temporally separate components in a sample,
  a first detector configured to acquire measurement data of components included in an outflowing liquid from the component separation unit by an analysis method different from mass spectrometry,
  a mass spectrometer configured to acquire mass spectrometry data including intensity information for each of mass-to-charge ratios of ions derived from the components contained in the outflowing liquid from the component separation unit, a chromatogram creation unit configured to create a chromatogram representing an intensity change of the measurement data with time based on the measurement data of the first detector, an information extraction unit configured to detect a peak based on the intensity change of the mass spectrometry data with time, and to extract information including a representative time of the peak, and a chromatogram display unit configured to display the chromatograph together with additional information corresponding to the extracted time.

Advantageous Effects of Invention

In the chromatograph mass spectrometer according to the present invention, the mass spectrometry data of the component contained in the outflowing liquid from the component separation unit is acquired regardless of the measurement value in the first detector, and the information including the representative time of the peak detected in the mass spectrometry data is extracted. The chromatogram created based on the measurement data of the first detector is displayed together with the additional information corresponding to the extracted time. Thus, even in the component not detected by the first detector or the component having the small measurement value by the first detector, it is possible to easily confirm on the chromatogram of the first detector that the component is detected by the mass spectrometer without confirming the mass spectrometry data.

DESCRIPTION OF EMBODIMENTS

Hereinafter, an embodiment of a chromatograph mass spectrometer according to the present invention will be described with reference to the drawings. The chromatograph mass spectrometer of the present embodiment is a liquid chromatograph mass spectrometer in which a mass spectrometer is combined with a liquid chromatograph including a UV detector, and has a configuration capable of performing all of a first analysis example, a modification example of the first analysis example, and a second analysis example to be described later.

[Configuration of Liquid Chromatograph Mass Spectrometer]

Figure 1:
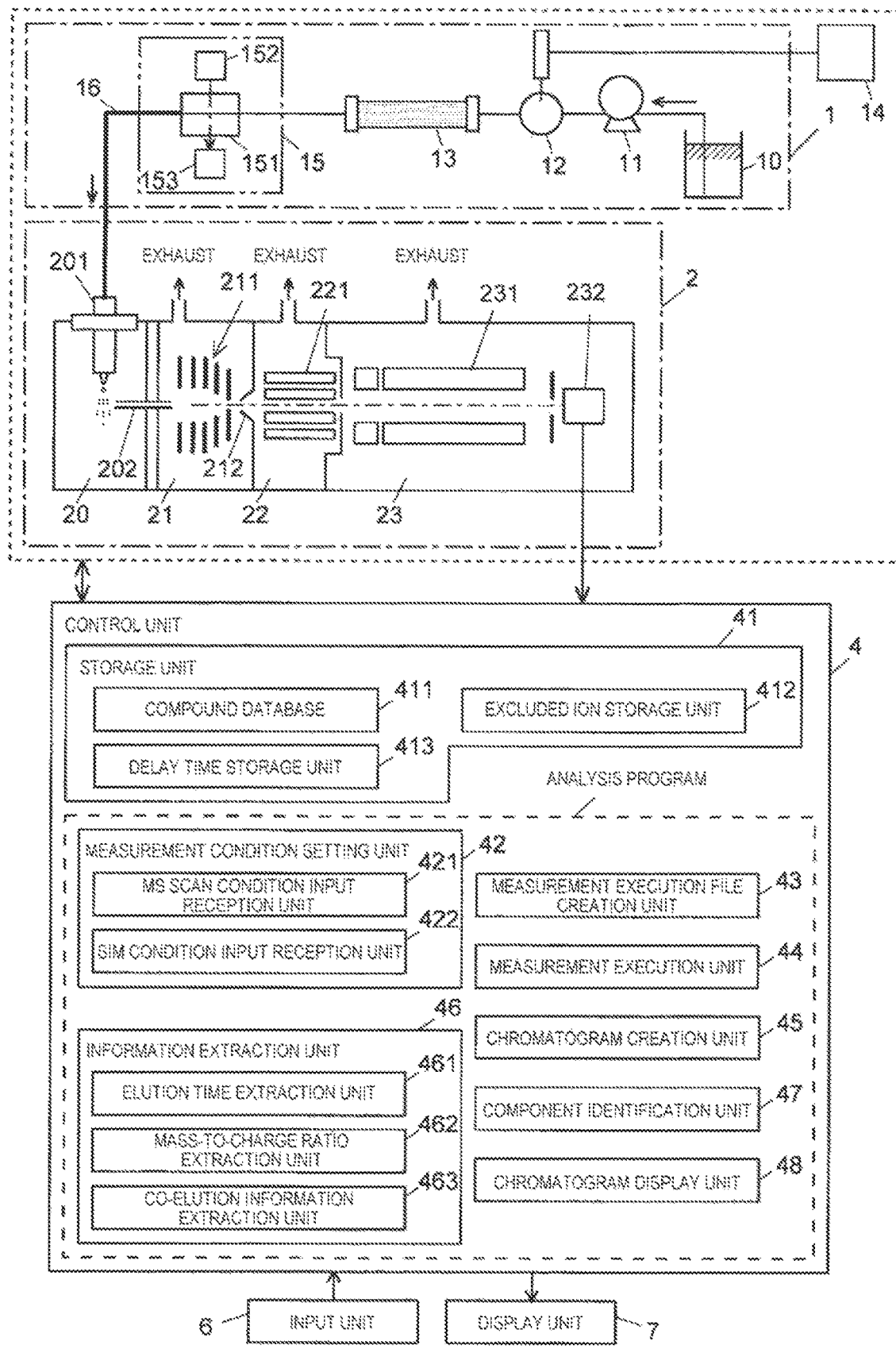
FIG. 1 is a configuration diagram of a main part of an embodiment of a chromatograph mass spectrometer according to the present invention.

FIG. 1 shows a configuration of a main part of the liquid chromatograph mass spectrometer of the present embodiment. The liquid chromatograph mass spectrometer of the present embodiment roughly includes a liquid chromatograph 1, a mass spectrometer 2, and a control unit 4 that controls operations of the liquid chromatograph and the mass spectrometer. The liquid chromatograph 1 includes a mobile phase container 10 in which a mobile phase is reserved, a pump 11 that sucks the mobile phase and delivers the mobile phase at a constant flow rate (or flow velocity), an injector 12 that injects a predetermined amount of sample solution into the mobile phase, a column 13 that temporally separates components contained in the sample solution, and a UV detector 15. The UV detector 15 includes a flow cell 151 into which the sample solution eluted from the column 13 is introduced, a UV lamp 152 that irradiates the sample solution flowing in the flow cell 151 with ultraviolet light having a predetermined wavelength, and a UV detection element 153 that measures an intensity of the ultraviolet light transmitted through the flow cell 151. An autosampler 14 that introduces a plurality of liquid samples one by one into the injector 12 is connected to the liquid chromatograph 1. The sample solution flowing out of the flow cell 151 is introduced into an electrospray ionization probe 201 of the mass spectrometer 2 through a pipe 16.

The mass spectrometer 2 has a configuration of a multi-stage differential exhaust system including a first intermediate vacuum room 21 and a second intermediate vacuum room 22 between an ionization room 20 at substantially an atmospheric pressure and a high-vacuum analysis room 23 evacuated by a vacuum pump (not illustrated), in which degrees of vacuum are increased stepwisely. The electrospray ionization probe (ESI probe) 201 that nebulizes the sample solution supplied from the liquid chromatograph 1 while applying electric charge to the sample solution is installed in the ionization room 20. The ionization room 20 and the first intermediate vacuum room 21 are communicatively connected with each other via a heated capillary 202 having a small diameter. The first intermediate vacuum room 21 and the second intermediate vacuum room 22 are separated by a skimmer 212 having a small hole at a top portion, and ion guides 211 and 221 for transporting ions to the subsequent stage while converging the ions are installed in the first intermediate vacuum room 21 and the second intermediate vacuum room 22, respectively. In the analysis room 23, a quadrupole mass filter 231 and an ion detector 232 are installed.

The mass spectrometer 2 can perform selected ion monitoring (SIM) measurement and MS scan measurement. In the SIM measurement, mass-to-charge ratios of ions passing through the quadrupole mass filter 231 are fixed, and only ions having the mass-to-charge ratio are detected. In the MS scan measurement, ions in a predetermined mass-to-charge ratio range are detected for each mass-to-charge ratio while scanning in a state in which the mass-to-charge ratios of the ions passing through the quadrupole mass filter 231 are in the predetermined mass-to-charge ratio range.

In addition to a storage unit 41 including a compound database 411, an excluded ion storage unit 412, and a delay time storage unit 413, the control unit 4 includes, as functional blocks, a measurement condition setting unit 42, a measurement execution file creation unit 43, a measurement execution unit 44, a chromatogram creation unit 45, an information extraction unit 46, a component identification unit 47, and a chromatogram display unit 48. The measurement condition setting unit 42 further includes, as functional blocks, an MS scan condition input reception unit 421 and a SIM condition input reception unit 422. The information extraction unit 46 further includes, as functional blocks, an elution time extraction unit 461, a mass-to-charge ratio extraction unit 462, and a co-elution information extraction unit 463. An entity of the control unit 4 is a personal computer, and when a predetermined analysis program installed on the computer in advance is executed, functions of the units are executed by a processor of the personal computer. An input unit 6 and a display unit 7 are connected to the control unit 4.

For each of a plurality of compounds, a name of the compound, a molecular weight of the compound, structural information such as a chemical formula and a structural formula, mass spectrum data obtained by performing the MS scan measurement on a standard sample of the compound, a value of a mass-to-charge ratio of a representative ion generated from each compound, and the like are recorded in the compound database 411. In the case of positive ion measurement in the liquid chromatograph mass spectrometer, the representative ion of the compound may include, for example, a mass-to-charge ratio of a protonated molecule obtained by adding proton ($H^+$) to a molecule of the compound, an adduct ion obtained by adding sodium ($Na^+$), potassium ($K^+$), ammonium ($NH_4^+$), or the like, a fragment ion that characterizes a structure of the compound, and the like.

In the excluded ion storage unit 412, information on a mass-to-charge ratio of an ion that may be generated from a substance other than the sample, such as the mobile phase used in the liquid chromatograph 1, is stored together with a name of the mobile phase or the like that generates the ion. A relationship between a time at which the component contained in the sample solution is measured by the UV detector 15, a difference in a time (delay time) at which the ion generated from the component contained in the sample solution is detected by the mass spectrometer 2, and a flow rate (or flow velocity) of the mobile phase is stored in the delay time storage unit 413. Information on the delay time is created, for example, based on a result of measuring the component detectable by both the UV detector 15 and the mass spectrometer 2 by a preliminary experiment.

First Analysis Example

Figure 2:
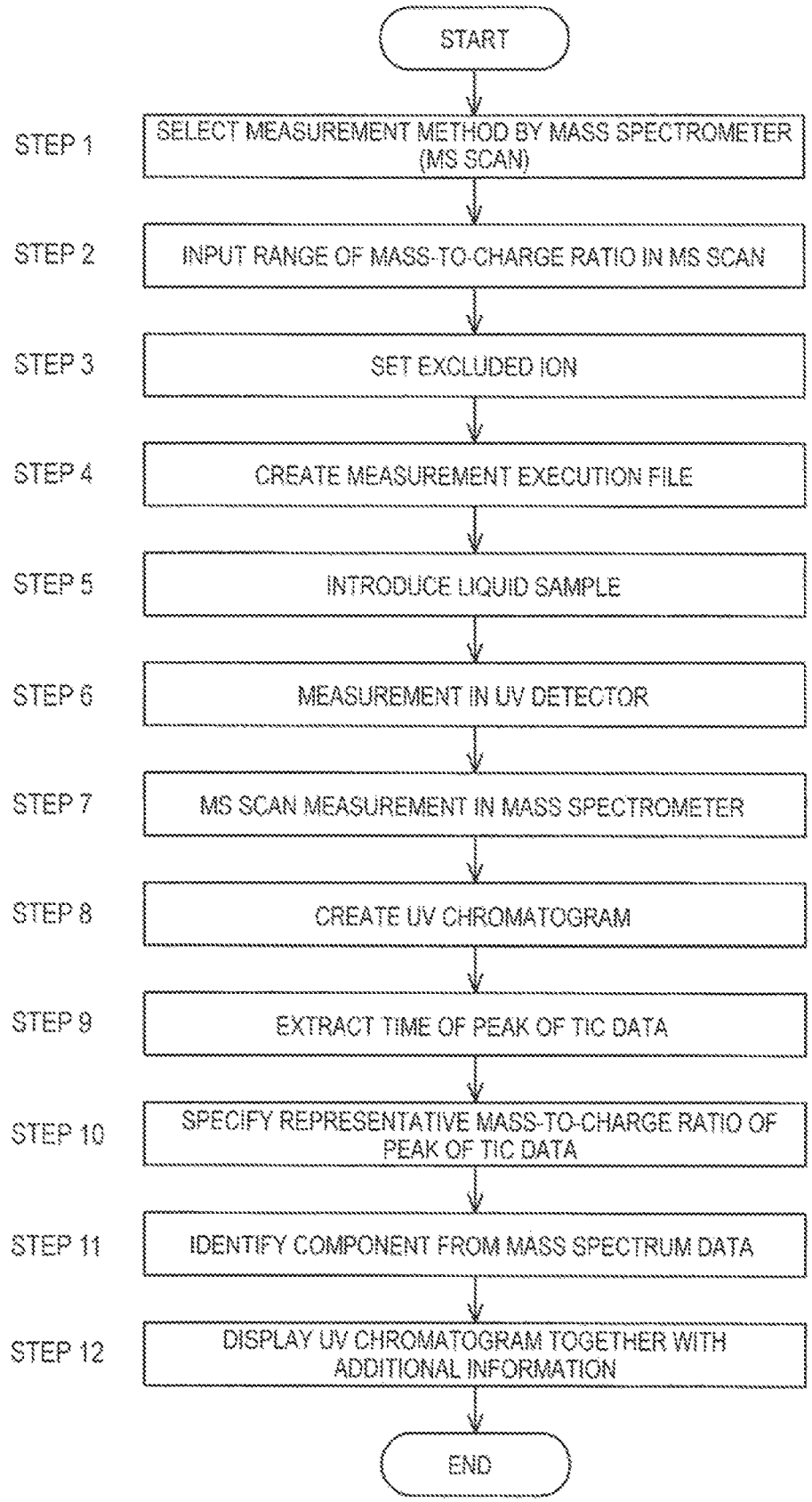
FIG. 2 is a flowchart related to a first analysis example using a liquid chromatograph mass spectrometer of the present embodiment.

Next, a procedure of a first analysis example using the chromatograph mass spectrometer of the present embodiment will be described with reference to a flowchart of FIG. 2. In the first analysis example, the MS scan measurement is performed by the mass spectrometer 2, and components contained in the liquid sample are analyzed.

When the user gives an instruction to start the analysis of the liquid sample by a predetermined operation, the measurement condition setting unit 42 displays, on the display unit 7, a screen for allowing the user to select whether to execute the MS scan measurement or the SIM measurement. As described above, the MS scan measurement is performed in the first analysis example.

When the user selects the MS scan measurement (step 1), the MS scan condition input reception unit 421 displays, on the display unit 7, a screen for inputting a range of the mass-to-charge ratio for mass scanning in the MS scan measurement. The range of the mass-to-charge ratio (m/z) is, for example, 100 to 2000, and is appropriately set in accordance with the mass-to-charge ratios of the ions generated from the component to be analyzed.

When the user inputs the range of the mass-to-charge ratio (step 2), the MS scan condition input reception unit 421 subsequently displays, on the display unit 7, a screen for inquiring the user whether or not the setting of an excluded ion is necessary. When the user selects the setting of the excluded ion, the name of the mobile phase or the compound recorded in the excluded ion storage unit 412 and the mass-to-charge ratios of the ions generated from the mobile phase or the compound are displayed on the display unit 7. When the user selects the name of the mobile phase or the compound, the mass-to-charge ratio associated with the selected mobile phase or compound is set as the mass-to-charge ratio of the excluded ion (step 3). Although the case has been described where the user per se selects the type of the mobile phase or the compound and sets the excluded ion, the ion generated from the mobile phase may be automatically set as the excluded ion in accordance with the type of the mobile phase used in the liquid chromatograph 1.

When the excluded ion is set (or the setting of the excluded ion is selected to be unnecessary by the user), the measurement execution file creation unit 43 describes a command to execute mass scanning in the range of the mass-to-charge ratio input by the user, and creates a measurement execution file in which the excluded ion is set (when the excluded ion is set) (step 4).

When the measurement execution file is created by the measurement execution file creation unit 43, the measurement execution unit 44 instructs the user to start the measurement by displaying a measurement execution button on the display unit 7 or the like. When the user gives an instruction to start the measurement, the measurement execution unit 44 controls the operations of the units of the liquid chromatograph 1 and the mass spectrometer 2 according to the description of the measurement execution file, and executes the MS scan measurement of the sample as follows. The liquid chromatograph 1 and the mass spectrometer 2 start to measure time in accordance with the instruction to start the measurement by the user, and start to acquire measurement data. Alternatively, the time measurement and the measurement data acquisition in the liquid chromatograph 1 and the mass spectrometer 2 may be started simultaneously with the introduction of the sample from the autosampler 14 to the injector 12.

After the start of the measurement, the sample is introduced from the autosampler 14 into the injector 12 (step 5). The sample introduced into the injector 12 is introduced into the column 13 along with the flow of the mobile phase, and the components in the sample are separated. The sample solution eluted from the column 13 is introduced into the flow cell 151 of the UV detector 15 in sequence. The flow cell 151 is irradiated with the ultraviolet light having the predetermined wavelength from the UV lamp 152 from the start of the measurement to the end of the measurement, and the intensity of the ultraviolet light transmitted through the flow cell 151 is measured by the UV detection element 153 at predetermined time intervals (step 6). The measured values of the intensities measured by the UV detection element 153 are stored in the storage unit 41 in sequence. The predetermined wavelength is, for example, 254 nm. This wavelength is appropriately set in accordance with absorption characteristics of the component to be analyzed.

The sample solution passed through the flow cell 151 is subsequently introduced into the ESI probe 201 and is ionized. The MS scan measurement is performed on the ions derived from the sample solution in the mass-to-charge ratio range described in the measurement execution file in the mass spectrometer 2 (step 7). The MS scan measurement is repeatedly performed at predetermined time intervals from the start of the measurement to the end of the measurement. The mass spectrum data acquired in each MS scan measurement is stored in the storage unit 41 in sequence.

After the measurement is completed, the chromatogram creation unit 45 reads out the measurement data of the UV detector 15 stored in the storage unit 41. Absorbance is calculated from the intensity of the ultraviolet light detected by the UV detector 15, and a chromatogram with the absorbance on a vertical axis and the time on a horizontal axis is created (step 8). Hereinafter, the chromatogram created from the measurement data acquired by the UV detector 15 is referred to as a UV chromatogram.

Subsequently, the elution time extraction unit 461 creates total ion chromatogram (TIC) data by summing intensities of the ions detected while the mass scanning is performed once from the mass spectrometry data repeatedly acquired by the MS scan measurement and stored in the storage unit 41. When the excluded ion is set by the user, the TIC data is created except for the intensity of the ion having the mass-to-charge ratio set as the excluded ion. Accordingly, TIC data excluding the influence of the ion derived from the substance other than the sample, such as the mobile phase, is obtained. When the TIC data is obtained, the elution time extraction unit 461 further detects a peak from the TIC data by a predetermined peak detection algorithm. Information on a position (time) at which the peak is detected is extracted, and a time obtained by subtracting the delay time from the extracted information is stored in the storage unit 41 (step 9).

A known method can be used as the predetermined peak detection algorithm, and for example, a method for calculating a slope of the chromatogram in a predetermined time range over the entire measurement time range from detection intensities of the ions at a plurality of consecutive points in time in the TIC data in sequence and detecting a peak start point, a peak top, and a peak end point based on the slope of the chromatogram at each point in time, can be used. In this case, a point in time when the slope shifts by a predetermined value or more, a point in time when the slope becomes near zero, and a point in time when the slope shifts by a predetermined value or less are detected as the peak start point, the peak top, and the peak end point, respectively. The information on the position (time) at which the peak extracted by the elution time extraction unit 461 is detected may be information on a representative time indicating the elution of the component in the sample around the detected point in time of the peak top, and is typically information on a time corresponding to the point in time of the peak top or a time corresponding to a center position of gravity of the detected peak. The time corresponding to the center position of gravity of the peak can be obtained, for example, by calculating the center position of gravity of the peak based on intensity information between the detected peak start point and peak end point.

In the present analysis example, although the TIC data is created by summing the detection intensities of the ions in the entire range of the mass-to-charge ratio (100 to 2000) in which the mass scanning is performed, the TIC data may be created by summing only the intensities of the ions in a predetermined partial mass-to-charge ratio range (for example, 300 to 2000) in the mass-to-charge ratio range in which the mass scanning is performed. In this case, the range of the mass-to-charge ratio to be the target of the TIC data is input by the user in advance and is included in the measurement execution file.

In the liquid chromatograph mass spectrometer of the present embodiment, the UV detector 15 and the mass spectrometer 2 are connected in series by a flow channel pipe 16. The components contained in the sample solution are detected by the UV detector 15 and are then detected by the mass spectrometer 2 with a certain time delay (time required for the components in the sample solution detected by the flow cell 151 to be detected by the ion detector 232 of the mass spectrometer 2). In the liquid chromatograph mass spectrometer of the present embodiment, since the time measurement and the measurement data acquisition in the liquid chromatograph 1 and the mass spectrometer 2 are simultaneously started, the position (time) of the peak detected from the TIC data by the elution time extraction unit 461 is shifted by the delay time from the time detected by the UV detector 15 (time at which the peak appears on the UV chromatogram). Thus, the elution time extraction unit 461 reads out the delay time matching the measurement condition (the flow velocity of the mobile phase or the like) from the delay time stored in the delay time storage unit 413, and subtracts the delay time from the time of the peak of the TIC data.

When the elution time extraction unit 461 extracts the information on the position (time) of the peak, the mass-to-charge ratio extraction unit 462 creates mass spectrum data from the mass spectrometry data acquired at the position of each peak, extracts a mass-to-charge ratio satisfying a predetermined condition from the mass spectrum (step 10), and stores the mass-to-charge ratio in the storage unit 41. The mass-to-charge ratio satisfying the predetermined condition is typically a mass-to-charge ratio of an ion corresponding to a peak (base peak) having the highest detection intensity in the mass spectrum, or a mass-to-charge ratio of one or a plurality of ions corresponding to a peak of detection intensity exceeding a predetermined threshold in the mass spectrum. Alternatively, a mass-to-charge ratio matching a representative mass-to-charge ratio of a compound stored in the compound database 411 may be the mass-to-charge ratio satisfying the predetermined condition.

Subsequently, the component identification unit 47 reads out the mass spectrum data corresponding to each peak extracted from the TIC data from the storage unit 41, and identifies the component by collating the mass spectrum data with the mass spectrum data recorded in the compound database 411 (step 11). The collation of these mass spectrum data is performed based on, for example, a position (mass-to-charge ratio) of a mass peak, an intensity ratio of each peak, and the like, and the component is identified (is identified with accuracy greater than or equal to a predetermined value) when a degree of matching is greater than or equal to a predetermined value. When a plurality of mass spectrum data having the peak at the position of the same mass-to-charge ratio (substantially the same peak) is acquired temporally continuously, the mass spectrum data having the largest intensity of the base peak is used as representative mass spectrum data of the plurality of mass spectrum data, and the component is identified. Information on the component identified by the component identification unit 47 is stored in the storage unit 41.

When the position (time) of the peak in the TIC data, the value of the representative mass-to-charge ratio of each peak, and the information on the component identified from the mass spectrum corresponding to each peak are obtained by the above-described processing by the information extraction unit 46 and the component identification unit 47, the chromatogram display unit 48 adds these information to the UV chromatogram, and displays the UV chromatogram on the display unit 7 (step 12). These information correspond to additional information in the present invention.

Figure 3:
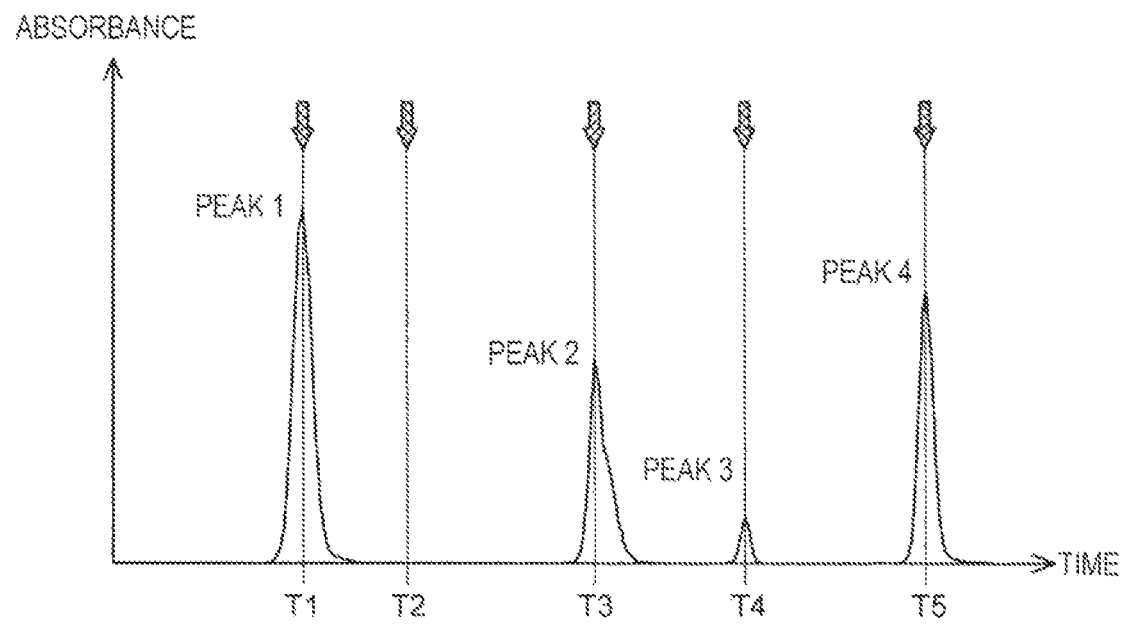
FIG. 3 is a display example of an analysis result in the first analysis example.
Figure 4:
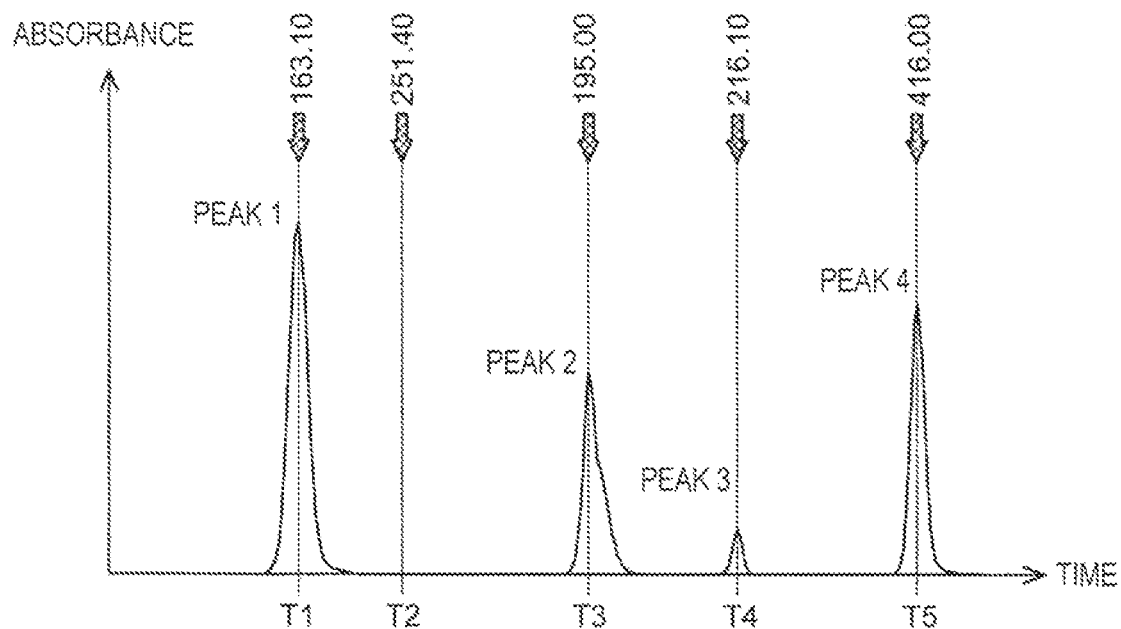
FIG. 4 is another display example of the analysis result in the first analysis example.
Figure 5:
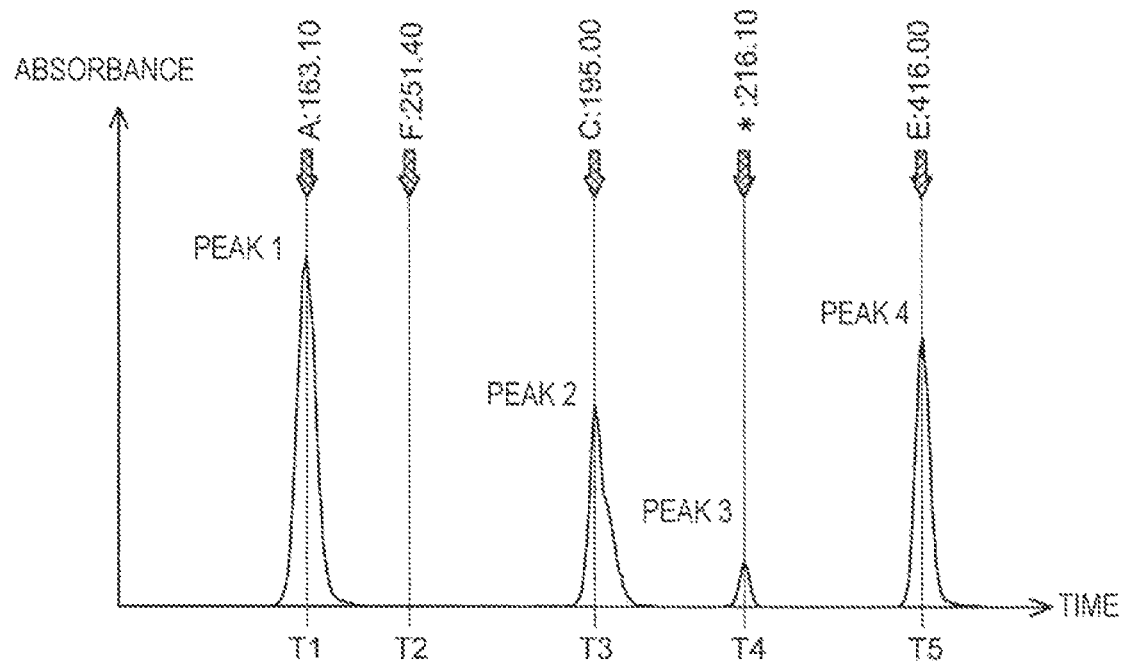
FIG. 5 is still another display example of the analysis result in the first analysis example.

FIGS. 3 to 5 are display examples by the chromatogram display unit 48. FIG. 3 is an example that can be displayed with a minimum configuration of the chromatograph mass spectrometer within the present invention (configuration not including the mass-to-charge ratio extraction unit 462 and the component identification unit 47), and a marker (arrow) indicating the position of the peak in the TIC data is added as additional information and is displayed on the UV chromatogram. In addition to the example of FIG. 3, in FIG. 4, a value of the representative mass-to-charge ratio of the mass spectrum acquired at the position of each peak of the TIC is added as additional information and is displayed. In addition to the example of FIG. 4, in FIG. 5, the name of the component identified from the mass spectrum data acquired at the position of each peak of the TIC is added as additional information and is displayed.

Positive ions generated when the sample solution is ionized by the ESI probe are mainly molecular weight-related ions such as protonated molecules, and peaks other than the molecular weight-related ions may hardly appear in a mass spectrum obtained by performing the MS scan measurement on the positive ions. Thus, it may be difficult to identify all the components from the mass spectrum. In such a case, the name of the compound and the mass-to-charge ratio of the base peak are displayed only for the component identified with accuracy greater than or equal to a predetermined value ("*" is displayed at the peak of the component not identified in the example of FIG. 5). On the other hand, when an ionization method for generating fragment ions at the time of ionization, such as an electron ionization method used in a gas chromatograph mass spectrometer, is used, ions having a plurality of mass-to-charge ratios are detected by the MS scan measurement. In such a case, it is relatively easy to identify the component, and it is possible to display both the mass-to-charge ratio of the base peak and the name of each component on the chromatogram.

In the display examples of FIGS. 3 to 5, the additional information (arrow) representing that the peaks of the TIC data are detected at five positions (T1, T2, T3, T4, and T5) is added to a UV chromatogram having four peaks (hereinafter, referred to as a peak 1, a peak 2, a peak 3, and a peak 4 in order from a peak having a shorter retention time). In a compound F (see FIG. 5), additional information is added to a position at which there is no peak of the UV chromatogram. This is because the compound F does not absorb the ultraviolet light having the predetermined wavelength and is detected only in the mass spectrometer 2. As described above, when the component that does not absorb the ultraviolet light having the predetermined wavelength at all (in this example, the compound F) is contained, the peak itself corresponding to the component does not appear in the UV chromatogram. Thus, in the chromatograph mass spectrometer of the related art described in Patent Literature 1, there is a problem that it is overlooked that such a component is contained in the sample.

On the other hand, in the present analysis example, the UV chromatogram based on the measurement data obtained by the UV detector 15 is displayed together with the additional information. Thus, even in the compound which does not absorb the ultraviolet light having the predetermined wavelength at all and cannot be detected by the UV detector 15, it is possible to easily confirm that the component is detected on the UV chromatogram by the mass spectrometer without confirming the mass spectrometry data.

Modification Example of First Analysis Example

As described above, the component that is not detected by the UV detector 15 can be confirmed on the UV chromatogram by detecting the elution time of the component derived from the sample based on the chromatogram of the TIC and giving the additional information indicating the detection time on the UV chromatogram.

However, in a TIC that does not handle information on ion separation by the mass-to-charge ratio, since a peak of a component eluted at an extremely close time may not be sufficiently separated, it is difficult to grasp the presence or absence of co-elution. For example, in the case of FIGS. 3 to 5, another peak overlaps behind the peak 2 and appears to be co-eluted, but it may be difficult to grasp information on such co-elution on the UV chromatogram in the first analysis example. The present modification example is suitably used in such a case, and the presence or absence of the co-elution is further grasped by using the co-elution information extraction unit 463. Hereinafter, processing using the co-elution information extraction unit 463 will be described.

Figure 6:
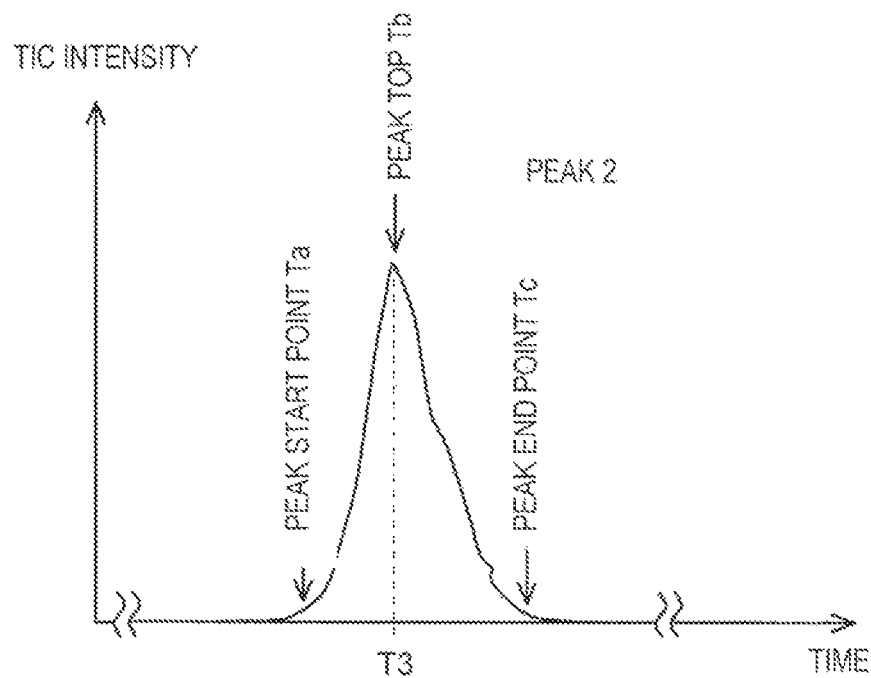
FIG. 6 is a diagram for describing detection of a peak of TIC in a modification example of the first analysis example.

The co-elution information extraction unit 463 first detects the peak in the chromatogram of the TIC data, and decides the peak start point, the peak top, and the peak end point as illustrated in FIG. 6. For this decision, the method described in the first analysis example may be used.

Figure 7:
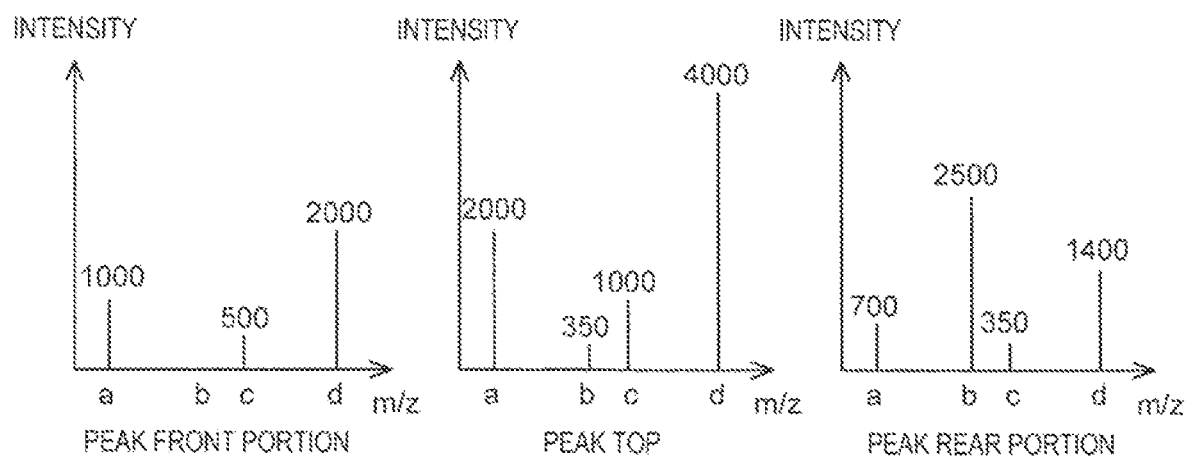
FIG. 7 is a mass spectrum in a peak front portion, a peak top, and a peak rear portion of the TIC in the modification example of the first analysis example.

Subsequently, the mass spectrum in a peak front portion (between the peak start point and the peak top), the peak top, and a peak rear portion (between the peak top and the peak end point) within a detected peak range (time range from the peak start point to the end point) is created (FIG. 7). A mass spectrum of the peak front portion is created from mass spectrum data acquired at an intermediate point in time between the peak start point and the peak top, and a mass spectrum of the peak rear portion is created from mass spectrum data acquired at an intermediate point in time between the peak top and the peak end point.

The mass peaks of the three types of mass spectra are detected. This detection is performed, for example, by extracting mass peaks having a predetermined intensity or more. Mass-to-charge ratios (m/z values in FIG. 7: a to d) and intensity information (values described above the mass peaks of the mass spectra shown in FIG. 7) of the mass peaks are acquired. In FIG. 7, the mass peak is illustrated in a rod shape for easy understanding, but an actual mass peak has a width. Accordingly, an intensity value of the peak top of the mass peak or an area value of the mass peak can be used as the intensity information of the mass peak.

Subsequently, intensity ratios between the mass peaks are calculated, a set of mass-to-charge ratios (m/z) at which intensity ratios between the mass peaks in the mass spectra of the peak front portion, the peak top, and the peak rear portion are constant is extracted, and these mass peaks are identified as the mass peaks of the ions derived from the same compound. For example, in the example of FIG. 7, the intensity ratios between three mass peaks of which the m/z values are a, c, and d are constant as a:c:d=2:1:4 in all of the mass spectra of the peak front portion, the peak top, and the peak rear portion, and it is possible to determine that the mass peaks are derived from the same compound.

On the other hand, for the mass peak of m/z=b, there is no other mass peak having an intensity ratio common to the mass spectra of the peak front portion, the peak top, and the peak rear portion. In such a case, it is determined that the mass peak of m/z=b is a mass peak of an ion derived from a component different from the component corresponding to the set of a, c, and d of the mass peaks described above.

As described above, co-elution information indicating that two different components of the components corresponding to the ions of m/z=a, c, and d and the component corresponding to the ion of m/z=b are co-eluted in the time range of the peaks detected from the TIC data is obtained by using the co-elution information extraction unit 463.

The elution time extraction unit 461 extracts a time at which the mass spectrum data in which the intensities of the mass peaks of the ions of m/z=a, c, and d identified to be derived from the same component are maximum is acquired based on the co-elution information. The above-described delay time is subtracted from the extracted time, and the subtracted time is extracted as the elution time of the component (component C) corresponding to m/z=a, c, and d. A time is extracted at which the mass spectrum data is acquired in which the intensity of the mass peak of m/z=b identified to be derived from another component is maximum, the delay time is subtracted from this extracted time, and the subtracted time is extracted as the elution time of the component (component B) corresponding to m/z=b.

The mass-to-charge ratio extraction unit 462 extracts, as the representative mass-to-charge ratio of the components corresponding to m/z=a, c, and d, the mass-to-charge ratio m/z=d in which the intensity of the mass peak is maximized among m/z=a, c, and d identified to be derived from the same component, and extracts, as the representative mass-to-charge ratio of the component corresponding to m/z=b, m/z=b identified to be derived from another component.

Subsequently, the component identification unit 47 compares the mass spectrum data with the mass spectrum data recorded in the compound database 411 and identifies the compound by using the set of mass peaks of the mass-to-charge ratios m/z=a, c, and d and m/z=b of the ions identified to be derived from the components different from each other.

Figure 8:
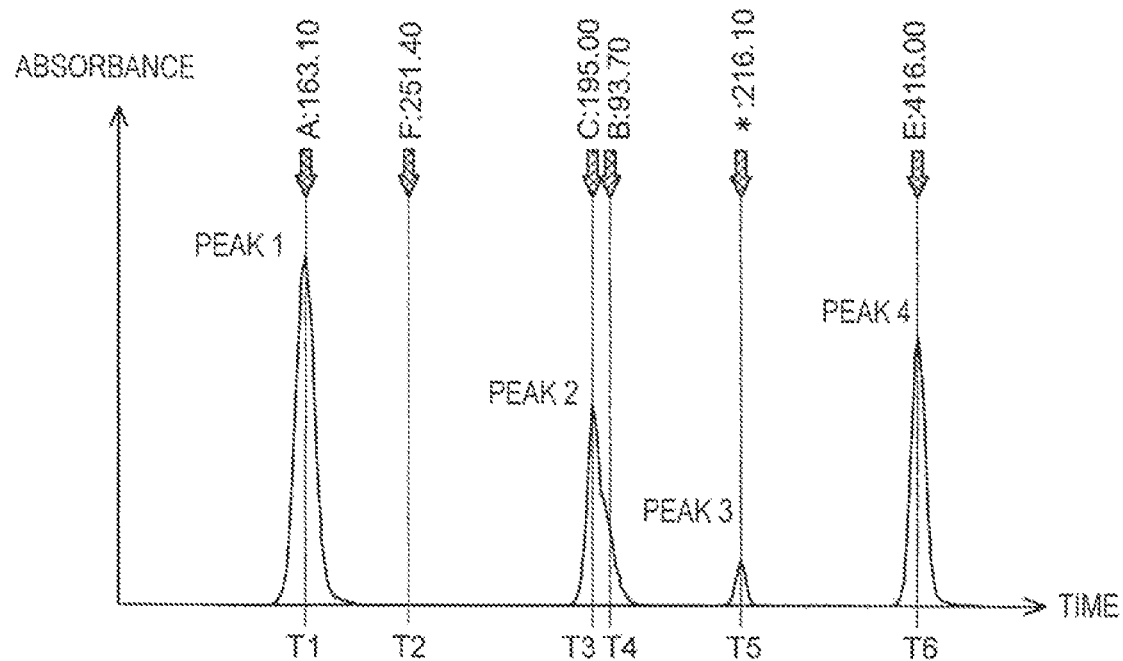
FIG. 8 is a display example of the analysis result in the modification example of the first analysis example.

The chromatogram display unit 48 displays the elution time extracted based on the co-elution information, the mass-to-charge ratio, and the information on the compound together with the UV chromatogram. An example of the display in the present modification example is illustrated in FIG. 8. In this display example, the markers (arrows) indicating the positions of the peaks in the TIC data, the value of the representative mass-to-charge ratio of the mass spectrum data acquired at the position of each peak of the TIC, and the name of the component identified from the mass spectrum data acquired at the position of each peak of the TIC are added as the additional information and are displayed on the UV chromatogram (the same additional information as the display example of FIG. 5 in the first analysis example is displayed).

In this modification example, for the peak 2 suspected of the co-elution in FIGS. 3 to 5, since representative elution time T4 and a mass-to-charge ratio (93.70. That is, the mass-to-charge ratio b=93.70) corresponding to the compound B in addition to the compound C are displayed as additional information, the co-elution can be easily confirmed on the UV chromatogram.

In the above modification example, although the mass spectrum of the peak front portion is created from the mass spectrum data obtained at the intermediate point in time between the peak start point and the peak top and the mass spectrum of the peak rear portion is created from the mass spectrum data obtained at the intermediate point in time between the peak top and the peak end point, the mass spectra may be created from the mass spectrum data obtained at a plurality of any points between the peak start point and the peak top and between the peak top and the peak end point. The mass spectrum of the peak front portion may be created from the mass spectrum data obtained at a point in time earlier than the peak top by a predetermined time, and the mass spectrum of the peak rear portion may be created from the mass spectrum data obtained at a point in time later than the peak top by a predetermined time.

Instead of the point in time of the peak top, the mass spectrum may be created from the mass spectrum data obtained at a point in time corresponding to the center of gravity of the peak. Alternatively, the mass spectra may be created and confirmed from the mass spectrum data at times obtained by dividing the peak range (the peak start point to the end point) at equal intervals without using the mass spectrum data acquired at the point in time of the peak top or the center of gravity. However, in order to detect the co-elution, it is desirable to create and confirm the mass spectra at a total of three points in time at least at the point in time of the peak top (or the center of gravity) and one point in time earlier and one point in time later than the peak top (or the center of gravity).

In the above modification example, although the set of mass peaks of which the intensity ratios are constant is associated with the same component, the intensity ratios between the mass peaks do not need to be strictly the same. For example, the set of mass peaks in which a difference between the intensity ratios between the mass peaks is within a predetermined range (for example, the intensity ratios are within ±10% with respect to the intensity ratio at a certain point in time or the like) may be used as the mass peaks of the ions derived from the same component.

In the above modification example, although m/z=d indicating the maximum intensity among the mass peaks of m/z=a, c, and d, which are considered to be the mass-to-charge ratios of the ions derived from the same component, is extracted as the representative mass-to-charge ratio value of the component, a representative mass-to-charge ratio value of each component may be extracted by another reference. For example, when the mass-to-charge ratio value is extracted from each mass spectrum, the ion derived from the mobile phase or the like stored in the excluded ion storage unit 412 may be set as the excluded ion, and the representative mass-to-charge ratio of the ion of each component may be extracted from the mass-to-charge ratio values of the ions except for the excluded ion.

In the above modification example, although the peak is detected by using the TIC data, the peak of the UV chromatogram may be detected, and the co-elution information may be extracted from the detected peak time range by the same method as described above. However, in this case, the co-elution information cannot be extracted from the peak (peak 2 or the like) that is not detected by the UV detector 15. Thus, as in the above-described modification example, it is desirable to perform the peak detection based on the TIC data obtained by the mass spectrometer.

A mode can also be adopted in which the co-elution information extraction unit 463 creates an extracted ion chromatogram (XIC) which is a chromatogram for each mass-to-charge ratio by using the intensity information of each mass-to-charge ratio obtained by the MS scan measurement and extracts the co-elution information by detecting a peak for each XIC. However, in the above modification example, only a few points of the peak range detected on the chromatogram of the TIC may be analyzed, and the co-elution information can be extracted more efficiently than in the detection of each peak of a large number of mass chromatograms.

Second Analysis Example

Figure 9:
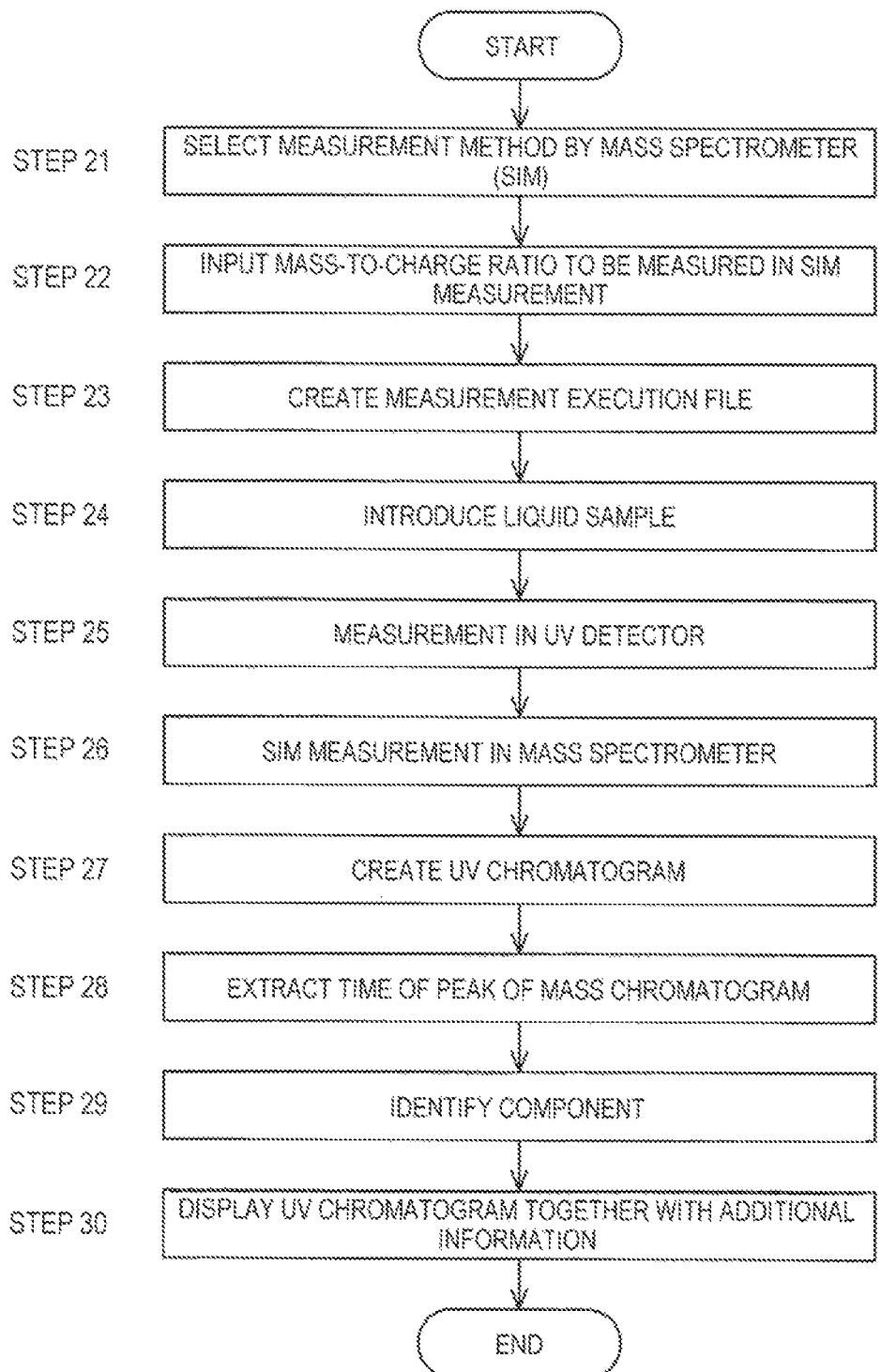
FIG. 9 is a flowchart related to a second analysis example using the liquid chromatograph mass spectrometer of the present embodiment.

Next, a procedure of a second analysis example using the chromatograph mass spectrometer of the present embodiment will be described with reference to a flowchart of FIG. 9. The second analysis example is an analysis example performed when the mass-to-charge ratios of the ions generated from the compound to be analyzed contained in the sample are known, and the components contained in the liquid sample are analyzed by performing the SIM measurement by the mass spectrometer 2. For example, this measurement is performed in order to confirm separation characteristics of the liquid chromatograph 2 after the column 13 is replaced or the measurement condition is changed.

When the user gives an instruction to start the analysis of the standard sample by the predetermined operation, the measurement condition setting unit 42 displays, on the display unit 7, a screen for allowing the user to select whether to execute the MS scan measurement or the SIM measurement. As described above, the SIM measurement is performed in the second analysis example.

When the user selects the SIM measurement (step 21), the SIM condition input reception unit 422 displays, on the display unit 7, a screen for allowing the user to input the mass-to-charge ratios of one or a plurality of ions used in the SIM measurement. The user inputs the mass-to-charge ratio of the ion that characterizes the compound for each compound to be measured. At this time, the user may input the value of the mass-to-charge ratio itself, or may input the mass-to-charge ratio of the compound by displaying a list of compounds stored in the compound database 411 by a predetermined operation and selecting a compound to be measured from the list. The input value of the mass-to-charge ratio may be one or plural for one compound. Hereinafter, a case will be described as an example where the mass-to-charge ratios of the ions generated from the compounds A to F are input.

When the user inputs the mass-to-charge ratios of the ions used in the SIM measurement (step 22), the measurement execution file creation unit 43 creates the measurement execution file that sequentially measures the mass-to-charge ratios input by the user (step 23).

When the measurement execution file is created by the measurement execution file creation unit 43, the measurement execution unit 44 prompts the user to start the measurement by displaying a measurement execution button on the display unit 7 or the like. When the user gives the instruction to start the measurement, the measurement execution unit 44 controls the operations of the units of the liquid chromatograph 1 and the mass spectrometer 2 according to the description of the measurement execution file, and executes the SIM measurement of the sample as follows.

First, the sample is introduced from the autosampler 14 to the injector 12 (step 24). The sample introduced into the injector 12 is introduced into the column 13 along with the flow of the mobile phase, and the components in the sample are separated. The sample solution eluted from the column 13 is introduced into the flow cell 151 of the UV detector 15 in sequence. The flow cell 151 is irradiated with the ultraviolet light having the predetermined wavelength from the UV lamp 152, and the intensity of the ultraviolet light transmitted through the flow cell 151 is measured by the UV detection element 153 at predetermined time intervals (step 25). The measured values of the intensities measured by the UV detection element 153 are stored in the storage unit 41 in sequence.

The sample solution passed through the flow cell 151 is subsequently introduced into the ESI probe 201 and is ionized. The SIM measurement is performed on the ions generated from the sample solution by the mass spectrometer 2 (step 26). That is, among the ions derived from the sample solution, the ions having the mass-to-charge ratio set for each compound are selected by the quadrupole mass filter 231 and are detected by the ion detector 235. From the start of the measurement to the end of the measurement, the SIM measurement of the ions having the mass-to-charge ratio corresponding to each of the compounds A to F described in the measurement execution file is repeatedly performed at predetermined time intervals. The intensities of the ions having the mass-to-charge ratio set for each compound are stored in the storage unit 41 in sequence. Accordingly, the mass chromatogram data of the ions that characterize the compounds A to F are obtained.

After the measurement is completed, the chromatogram creation unit 45 reads out the measurement data of the UV detector 15 stored in the storage unit 41, calculates the absorbance from the intensity of the detected ultraviolet light, and creates the chromatogram (UV chromatogram) with the absorbance on the vertical axis and the time on the horizontal axis (step 27).

Subsequently, the elution time extraction unit 461 detects the peak from the mass chromatogram data of each compound stored in the storage unit 41, extracts the information on the position (time) at which the peak is detected (step 28), and stores the information in the storage unit 41. Similarly to the first analysis example, a known peak detection algorithm can be used as the peak detection of the mass chromatogram data of each compound. The component identification unit 47 identifies the component corresponding to the detected peak based on the value of the mass-to-charge ratio obtained by acquiring the mass chromatogram in which the peak appears (step 29).

When the information on the position (time) of the peak of each mass chromatogram data and the component corresponding to each peak are obtained by the elution time extraction unit 461 and the component identification unit 47, the chromatogram display unit 48 adds these information to the UV chromatogram as the additional information and displays the additional information on the display unit 7 (step 30). The additional information in the present analysis example can include the peak position (time) of the chromatogram, the mass-to-charge ratio of the ion that characterizes each compound, and the information on the component.

Figure 10:
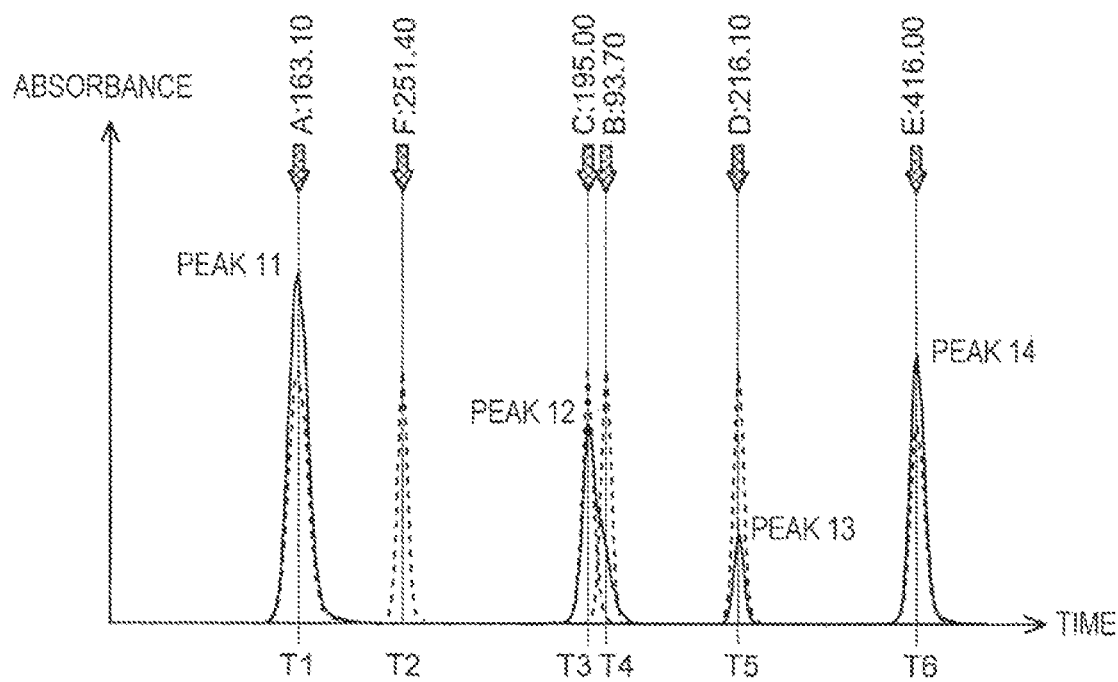
FIG. 10 is a display example of an analysis result in the second analysis example.

FIG. 10 is a display example by the chromatogram display unit 48. In this example, an arrow indicating the position of the peak in the mass chromatogram data, the mass-to-charge ratio of the ion corresponding to the peak, and the name of the component are added as the additional information to the UV chromatogram, and the mass chromatogram corresponding to each compound is superimposed and displayed in a color or a line type (broken line in FIG. 10) different from that of the UV chromatogram. The display or non-display of the mass chromatogram can be switched by a predetermined operation by the user.

In the UV chromatogram shown in FIG. 10, there are four peaks in total (hereinafter, the peaks are referred to as a peak 11, a peak 12, a peak 13, and a peak 14 in order from a peak having a shorter retention time). On the other hand, six additional information are displayed. For example, for the compound F, additional information is displayed at a position at which there is no peak in the UV chromatogram. This is because the compound F does not absorb the ultraviolet light having the predetermined wavelength and is detected only in the mass spectrometer 2. Whether or not the compound to be measured absorbs light having a predetermined wavelength irradiated by the UV detector is not necessarily known in advance. The compound F is such an example, and as described above, when the component (compound F) that does not absorb the ultraviolet light having the predetermined wavelength at all is contained in the sample, the peak corresponding to the component does not appear. Such a component cannot be measured by the chromatograph mass spectrometer of the related art as described in Patent Literature 1, but such a component can also be measured by using the chromatograph mass spectrometer of the present embodiment.

Similarly to the peak 3 of the first analysis example (FIGS. 3 to 5), the plurality of components (compounds B and C) is co-eluted also at the position (time) of the peak 12 of the present analysis example. When the plurality of components is co-eluted as described above, ions having different mass-to-charge ratios are detected at a predetermined intensity or higher (that is, peaks of different mass chromatograms appear) between a start time and an end time of the peak 12, and the additional information and the peak of the mass chromatogram are displayed together with the UV chromatogram. Accordingly, it is possible to easily recognize that the plurality of components is co-eluted in a time zone of the peak 12.

The above embodiment is an example, and can be appropriately changed in accordance with the gist of the present invention.

Although the MS scan measurement has been performed in the first analysis example and the SIM measurement has been performed in the second analysis example, when a mass spectrometer such as a triple quadrupole mass spectrometer is used, product ion scan measurement can be performed instead of the MS scan measurement, and MRM measurement can be performed instead of the SIM measurement. In this case, product ion scan measurement conditions, product ion spectra, or MRM measurement conditions may be stored in the compound database 411 in advance.

In the first analysis example and the second analysis example, although an aspect is illustrated in which it is possible to visually and intuitively grasp at which time the component in the sample is detected by the mass spectrometer 2 by displaying the additional information extracted by the information extraction unit 46 as the marker at the time position corresponding to the representative time of the peak detected by the information extraction unit 46 on the UV chromatogram, it is not always necessary to display the additional information at the corresponding time position on the UV chromatogram, and, for example, the additional information may be displayed for the peak detected on the UV chromatogram. Such a modification example will be described with reference to FIG. 11.

In this case, first, the peak detection is performed on the UV chromatogram by a known peak detection algorithm (for example, similar to the method described in the first analysis example), and each peak range on the UV chromatogram is decided. Which peak time range of each peak range on the UV chromatogram the elution time extracted by the information extraction unit 46 belongs to is determined based on the mass spectrometry data, and thus, the marker is displayed for each peak on the UV chromatogram by associating the peak on the UV chromatogram with the additional information. The additional information corresponding to each peak is given.

Figure 11:
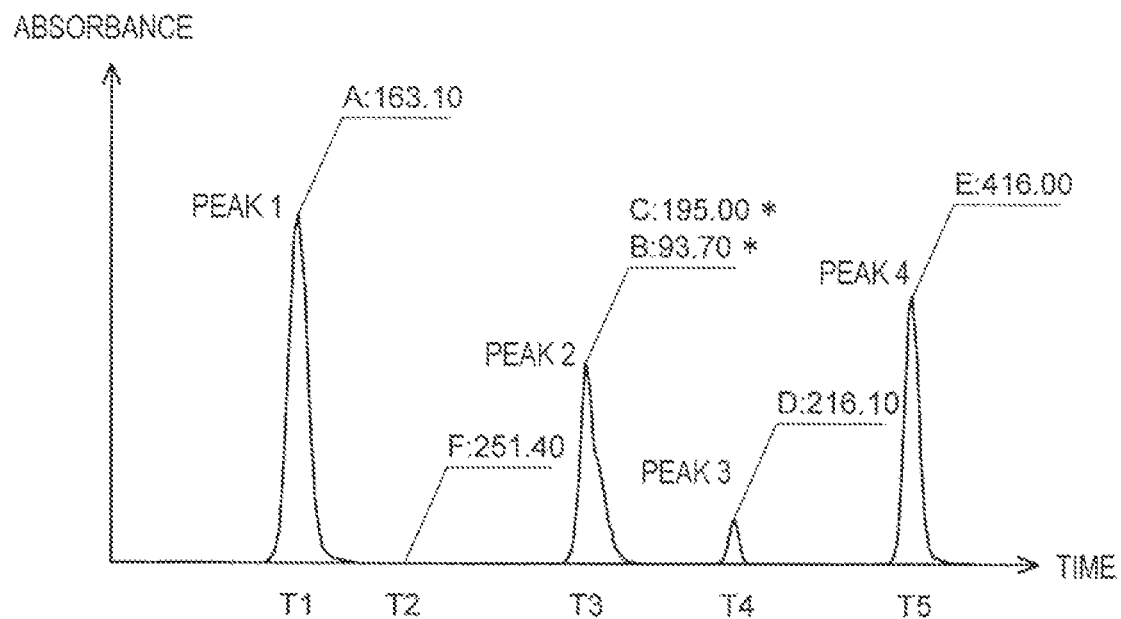
FIG. 11 is a modification example of display of the analysis result in the first analysis example or the second analysis example.

When there is the peak detection in the measurement data of the mass spectrometer in a time zone in which there is no peak detection on the UV chromatogram, the additional information may be given to the time position (compound F in FIG. 11 or the like). When the information extraction unit determines that there is co-elution with respect to the peak range in which the peak is detected on the UV chromatogram (the modification example of the first analysis example and the second analysis example), information indicating the presence or absence of the co-elution ("*" in FIG. 11 or the like) may be given to the UV chromatogram.

The additional information may be displayed in a table format. Such a modification example will be described with reference to FIGS. 12 and 13.

Figure 12:
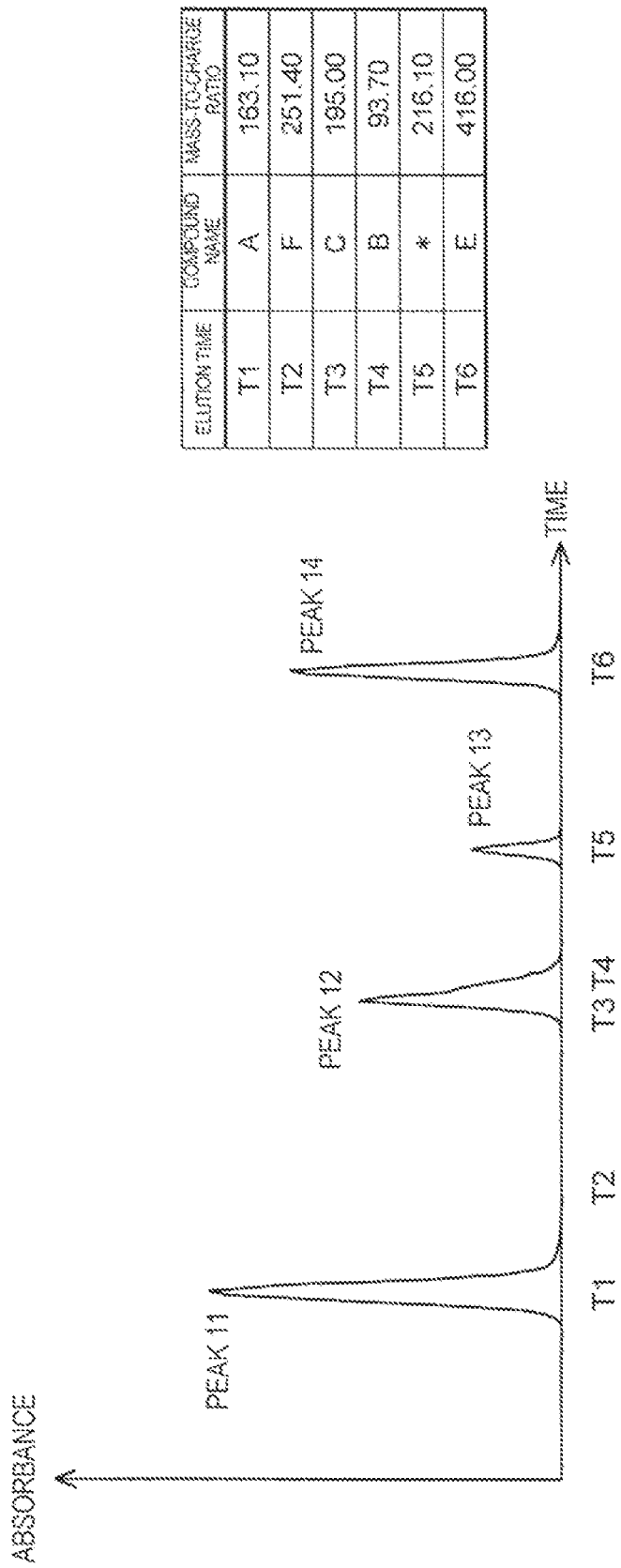
FIG. 12 is another modification example of the display of the analysis result in the first analysis example or the second analysis example.

FIG. 12 is a display example when the additional information is in the table format. In addition to the elution time extracted by the elution time extraction unit 461 based on the mass spectrometry data, additional information including the compound name identified by the component identification unit 47 and the mass-to-charge ratio extracted by the mass-to-charge ratio extraction unit 462 is displayed in the table format. In the example of FIG. 12, since the additional information is displayed outside the UV chromatogram, the additional information in the table format is useful, for example, when there is a plurality of peaks on the UV chromatogram and it becomes very complicated to individually confirm the peaks from the display of the chromatogram.

Figure 13:
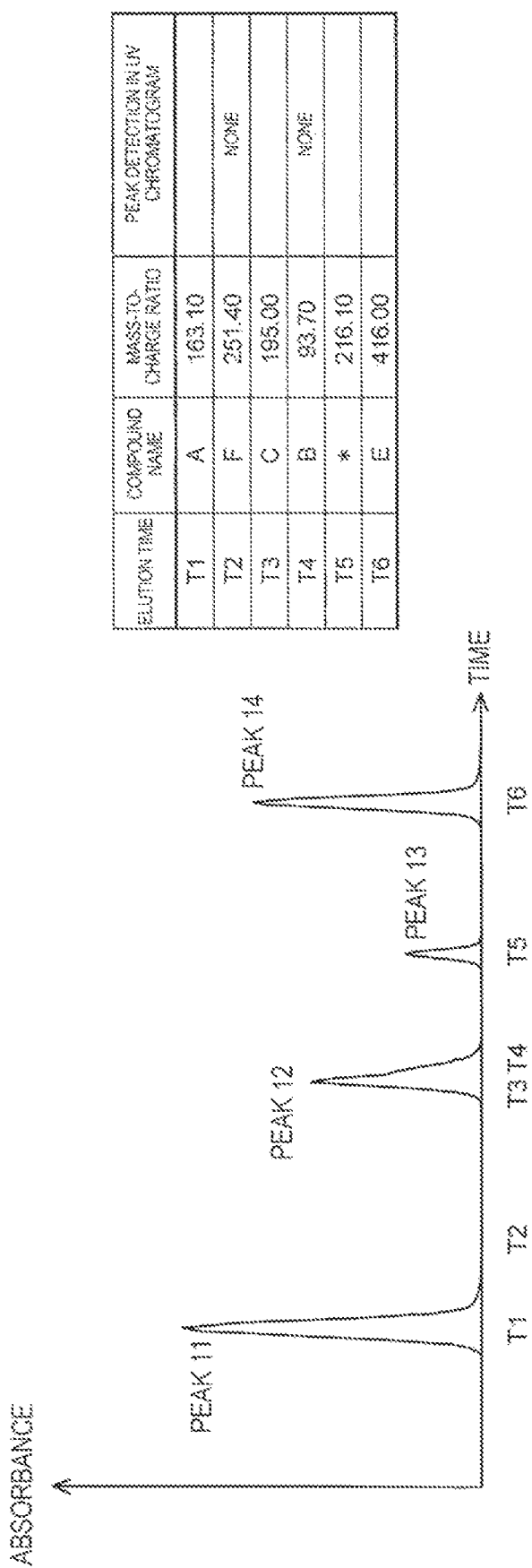
FIG. 13 is still another modification example of the display of the analysis result in the first analysis example or the second analysis example.

In addition to the display example of FIG. 12, in FIG. 13, information (rightmost column) indicating whether or not the peak on the UV chromatogram based on the measurement data is detected by the UV detector 15 is further displayed as the additional information. In this example, the elution time extraction unit 461 performs the peak detection on both the chromatogram (TIC or XIC) of the mass spectrometry data and the UV chromatogram, and determines whether or not the peak is also detected on the UV chromatogram at a time at which the peak is detected on the chromatogram of the mass spectrometry data. As a result, when the peak is detected on the chromatogram of the mass spectrometry data but there is a time at which the peak is not detected on the UV chromatogram, the information is further displayed as the additional information. In FIG. 13, the information indicating that the peak is not detected on the UV chromatogram is added at elution time T2 corresponding to the compound F and elution time T4 corresponding to the compound B. Accordingly, the user can more clearly grasp the presence or absence of the compound of which the peak is detected only by the mass spectrometer 2. In this example, although the compound B absorbs the ultraviolet light having the predetermined wavelength, since the absorbance of the compound B is smaller than that of the compound C eluted at a close time, the peak of the compound B is buried in the peak of the compound C on the UV chromatogram, and the peak is not detected at the elution time of the compound C.

Figure 14:
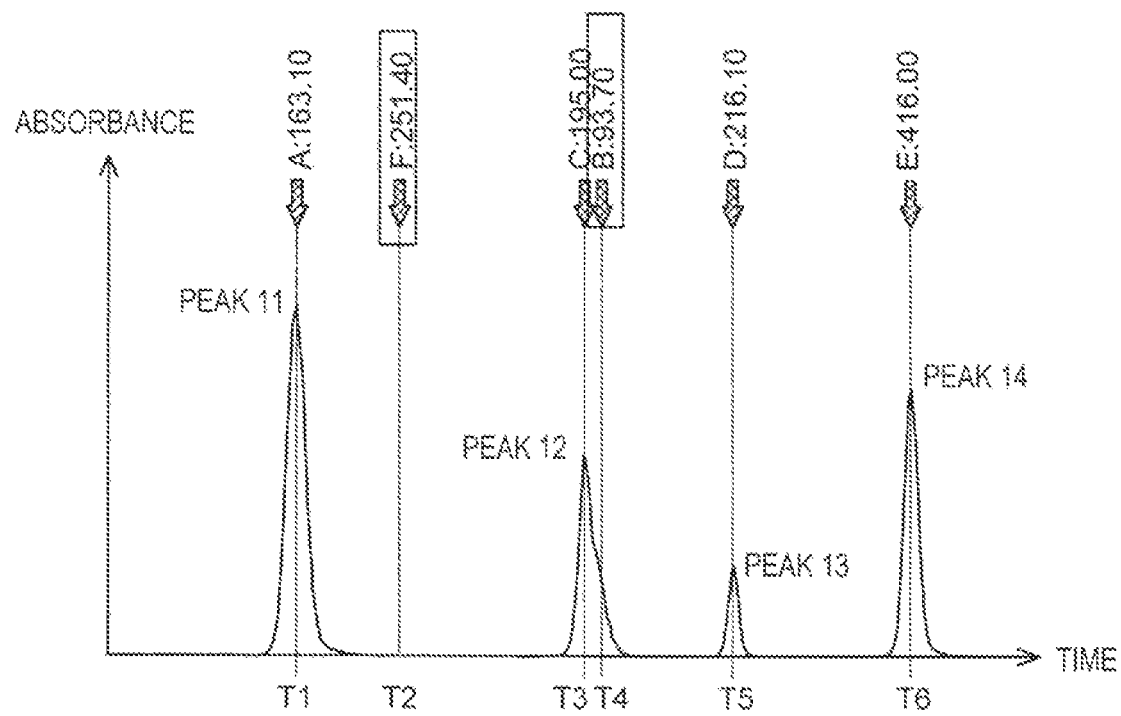
FIG. 14 is still another modification example of the display of the analysis result in the first analysis example or the second analysis example.

As described above, the information indicating that there is the time at which the peak is detected on the chromatogram of the mass spectrometry data but the peak is not detected on the UV chromatogram can also be indicated by a display example in which a marker is added at a corresponding time position on the UV chromatogram, as shown in FIGS. 3 to 5, 8, and 10. Such an example is shown in FIG. 14. In FIG. 14, the peak is not detected on the UV chromatogram but additional information corresponding to elution times T2 and T4 of the compounds F and B in which the peak is detected on the chromatogram of the mass spectrometry data is displayed in a frame, and thus, the user can more clearly grasp whether or not the peak is detected only by the mass spectrometer 2.

When there are many kinds of compounds contained in the sample, the peaks of the plurality of compounds may be integrated into one in TIC, and the peak may not be detected. Thus, when there are many kinds of compounds or when it is assumed that a plurality of compounds having close elution times is contained in the sample, the peaks of the plurality of compounds can be more reliably detected by detecting the peaks from XIC.

In the above embodiment, although the mass spectrometer is a combination of the liquid chromatograph including the UV detector and the mass spectrometer, a gas chromatograph may be used instead of the liquid chromatograph. A detector other than the UV detector and the mass spectrometer may be provided. For example, in the case of the liquid chromatograph, a photodiode array detector (PDA detector), a spectrofluorescence detector, a differential refractive index detector, or the like can be used as the first detector.

As for the chromatogram created based on the measurement data in the first detector, although the embodiment has been described in which absorbance for a predetermined wavelength (254 nm) is measured by using the UV detector and a chromatogram representing a temporal change of the absorbance is created, the chromatogram may be any chromatogram as long as the intensity information of the measurement data measured based on the detection technique of the first detector is used, and there may be various forms. For example, absorbance at each wavelength may be measured by scanning a predetermined wavelength range, and a chromatogram of absorbance for a wavelength selected by the user may be created, or a chromatogram for an integrated value of absorbance in a predetermined wavelength range may be created.

In the above embodiment, although the components in the sample solution are ionized by the electrospray ionization method in the mass spectrometer 2, other ionization methods can also be adopted. For example, in the liquid chromatograph mass spectrometer, an atmospheric pressure chemical ionization (APCI) method can also be used. In the gas chromatograph mass spectrometer, various ionization methods such as an electron impact ionization (EI) method, a chemical ionization (CI) method, and a photoionization (PI) method can be used.

As the first detector that acquires the measurement data for creating the chromatogram, it is preferable to select a detector having high measurement reproducibility like the UV detector 15 of the above embodiment. Due to the use of such a detector, each component can be quantified with high accuracy from a peak area and a peak height of the chromatogram.

In the above embodiment, although the first detector (UV detector 15) and the mass spectrometer 2 are arranged in series, it is also possible to adopt a configuration in which both the first detector and the mass spectrometer are arranged in parallel and the sample solution eluted from the column 13 is supplied to the first detector and the mass spectrometer. A unit other than the column 13 may be used as the component separation unit of the chromatograph.

[Aspects]

It is understood by those skilled in the art that the exemplary embodiments described above are specific examples of the following aspects.

(First Aspect)

A chromatograph mass spectrometer according to a first aspect of the present invention includes
 a component separation unit configured to temporally separate components in a sample,
 a first detector configured to acquire of measurement data of components included in an outflowing liquid from the component separation unit by an analysis method different from mass spectrometry,
 a mass spectrometer configured to acquire mass spectrometry data including intensity information for each of mass-to-charge ratios of ions derived from the components contained in the outflowing liquid from the component separation unit,
 a chromatogram creation unit configured to create a chromatogram representing an intensity change of the measurement data with time based on the measurement data of the first detector,
 an information extraction unit configured to detect a peak based on the intensity change of the mass spectrometry data with time, and to extract information including a representative time of the peak, and
 a chromatogram display unit configured to display the chromatograph together with additional information corresponding to the extracted time.

In the chromatograph mass spectrometer of the first aspect, the mass spectrometry data of the component contained in the outflowing liquid from the component separation unit is measured regardless of the measurement value in the first detector, and the additional information including the representative time of the peak detected in the mass spectrometry data is extracted. The chromatogram created based on the measurement data of the first detector is displayed together with the additional information. Thus, even in the component not detected by the first detector or the component having the small measurement value by the first detector, it is possible to easily confirm on the chromatogram of the first detector that the component is detected by the mass spectrometer without confirming the mass spectrometry data.

(Second Aspect)

According to a chromatograph mass spectrometer of a second aspect of the present invention, in the chromatograph mass spectrometer according to the first aspect,
 the chromatogram display unit displays the additional information at a position on the chromatogram corresponding to the representative time of the peak detected by the information extraction unit.

In the chromatograph mass spectrometer of the second aspect, the additional information is displayed at the time position or the peak position corresponding to the representative time of the peak detected by the information extraction unit on the chromatogram. Thus, when there is the component detected only by the mass spectrometer, the presence of the component can be visually and intuitively grasped.

(Third Aspect)

According to a chromatograph mass spectrometer of a third aspect of the present invention, in the chromatograph mass spectrometer according to the first aspect or the second aspect, the information extraction unit further determines whether or not there is a peak at a position, on the chromatogram created based on the measurement data of the first detector, which corresponds to a time at which the peak is detected, and the chromatogram display unit further adds, to the additional information, information indicating that there is no peak in the measurement data of the first detector at the time at which the peak is detected when it is determined that there is no peak by the information extraction unit.

In the chromatograph mass spectrometer of the third aspect, when there is no peak on the chromatogram created based on the measurement data of the first detector at the time at which the peak is detected from the mass spectrometry data, since the information is displayed as the additional information, it is possible to reliably grasp that there is the component detected only by the mass spectrometer.

(Fourth Aspect)

According to a chromatograph mass spectrometer of a fourth aspect of the present invention, in the chromatograph mass spectrometer according to the first aspect or the second aspect, the representative time of the peak is a time at which an intensity of the mass spectrometry data is maximum or a time corresponding to a center of gravity of the peak.

In the chromatograph mass spectrometer of the fourth aspect, since the time at which the intensity of the mass spectrometry data is maximized or the time corresponding to the center of gravity of the peak of the mass spectrometry data is set as the representative time of the peak, the information on the time accurately reflecting the elution time of the component can be extracted as the additional information.

(Fifth Aspect)

According to a chromatograph mass spectrometer of a fifth aspect of the present invention, in the chromatograph mass spectrometer according to any of the first aspect to the fourth aspect, the intensity change of the mass spectrometry data with time is a time-series intensity change of an addition intensity obtained by adding an intensity in an entire measured mass-to-charge ratio range or a predetermined mass-to-charge ratio range.

In the chromatograph mass spectrometer of the fifth aspect, since the peak is detected from the data of the total ion chromatogram, it is possible to extract the additional information including the representative time of the peak in a shorter time than when the mass chromatograms of a plurality of or all of the mass-to-charge ratios in the measurement range is confirmed.

(Sixth Aspect)

According to a chromatograph mass spectrometer of a sixth aspect of the present invention, the chromatograph mass spectrometer according to the fifth aspect further includes an excluded ion storage unit configured to store information on a mass-to-charge ratio of an excluded ion which is not added to the addition intensity, and the addition intensity is an intensity value excluding an ion intensity corresponding to the mass-to-charge ratio of the excluded ion.

In the chromatograph mass spectrometer of the sixth aspect, it is possible to use a more accurate total ion chromatogram obtained by adding only the intensities of the ions generated from the sample by setting, as the excluded ion, a mass-to-charge ratio of an ion generated from a substance other than the sample such as the mobile phase.

(Seventh Aspect)

According to a chromatograph mass spectrometer of a seventh aspect of the present invention, in the chromatograph mass spectrometer according to any of the first aspect to the sixth aspect, the information extraction unit extracts mass spectrum data from mass spectrometry data acquired at a plurality of points in time within a time range in which the peak is detected, detects a plurality of mass peaks from the mass spectrum data at the plurality of points in time, specifies a set of mass peaks having intensity ratios common to mass spectrum data at the plurality of points in time, detects a time at which an intensity of the mass peaks included in the set is maximized, and sets the detected time as the representative time of the peak.

In the chromatograph mass spectrometer of the seventh aspect, since the set of mass peaks having the intensity ratios common to the mass spectrum data at a plurality of points in time is specified as that corresponding to one component, it is possible to efficiently extract the co-elution information, and it is possible to grasp the presence or absence of the co-elution on the UV chromatogram.

(Eighth Aspect)

According to a chromatograph mass spectrometer of an eighth aspect of the present invention, in the chromatograph mass spectrometer according to any of the first aspect to the seventh aspect, the intensity change of the mass spectrometry data with time is a time-series intensity change of the mass spectrometry data measured for one or a plurality of individual mass-to-charge ratios.

In the chromatograph mass spectrometer of the eighth aspect, since the mass chromatogram can be obtained by measuring the ions having one or a plurality of individual characteristic mass-to-charge ratios of the compound, discriminability of the compound is higher than that of the total ion chromatogram, and since an S/N ratio is also improved by eliminating noise, the detection accuracy of the peak is improved. This aspect is particularly useful in finding that the plurality of compounds is co-eluted.

(Ninth Aspect)

According to a chromatograph mass spectrometer of a ninth aspect of the present invention, in the chromatograph mass spectrometer according to any of the first aspect to the eighth aspect, the information extraction unit further includes a mass-to-charge ratio extraction unit configured to extract a mass-to-charge ratio satisfying a predetermined condition from the mass spectrometry data measured at the extracted time, and additional information to be added to the chromatogram includes information related to the extracted mass-to-charge ratio.

(Tenth Aspect)

According to a chromatograph mass spectrometer of a tenth aspect of the present invention, in the chromatograph mass spectrometer according to the ninth aspect, the mass-to-charge ratio satisfying the predetermined condition is a mass-to-charge ratio having an intensity exceeding a predetermined intensity threshold or a mass-to-charge ratio having a maximum intensity in the mass spectrometry data acquired at the extracted time.

(Eleventh Aspect)

According to a chromatograph mass spectrometer of an eleventh aspect of the present invention, in the chromatograph mass spectrometer according to the ninth aspect or the tenth aspect, the information related to the mass-to-charge ratio includes at least one of a value of the mass-to-charge ratio, a molecular weight of a compound corresponding to the mass-to-charge ratio, a chemical formula, a structural formula, and a compound name.

In the chromatograph mass spectrometer of the ninth aspect to the eleventh aspect, the mass-to-charge ratio satisfying the predetermined condition (in the tenth aspect, the mass-to-charge ratio having the intensity exceeding the predetermined intensity threshold or having the maximum intensity) is extracted, and the information related to the mass-to-charge ratio satisfying the predetermined condition (in the eleventh aspect, the value of the mass-to-charge ratio, the molecular weight corresponding to the mass-to-charge ratio, the chemical formula, the structural formula, and the compound name) is added as the additional information. Thus, the user per se can grasp the information such as the mass-to-charge ratio of the compound eluted at this time without confirming the mass spectrometry data.

(Twelfth Aspect)

According to a chromatograph mass spectrometer of a twelfth aspect of the present invention, the chromatograph mass spectrometer according to any of the first aspect to the eleventh aspect further includes a compound database configured to store mass spectrometry data for each of a plurality of compounds, and a component identification unit configured to identify the components contained in the outflowing liquid by collating the mass spectrometry data acquired at the time extracted by the information extraction unit with the mass spectrometry data stored in the compound database.

The additional information includes information on the component identified by the component identification unit.

In the chromatograph mass spectrometer of the twelfth aspect, since the information on the component contained in the outflowing liquid from the component separation unit is displayed on the chromatograph, the user can easily confirm the component contained in the sample.

(Thirteenth Aspect)

According to a chromatograph mass spectrometer of a thirteenth aspect of the present invention, in the chromatograph mass spectrometer according to the twelfth aspect, the mass spectrometry data measured at the time extracted by the information extraction unit is a mass spectrum representing a relationship between a mass-to-charge ratio and an ion intensity.

In the chromatograph mass spectrometer of the thirteenth aspect, the component is identified by collating the mass spectrum obtained by the measurement with the mass spectrum stored in the compound database. Since the information on the position (mass-to-charge ratio) and the intensity of the peak appearing in the mass spectrum can be used for the collation of the mass spectrum, the component in the sample can be identified with high accuracy.

(Fourteenth Aspect)

According to a chromatograph mass spectrometer of a fourteenth aspect of the present invention, in the chromatograph mass spectrometer according to the twelfth aspect or the thirteenth aspect, a measurement condition for measuring the mass spectrometry data of the plurality of compounds is stored in the compound database, and the chromatograph mass spectrometer further includes a compound input reception unit configured to receive an input of information for designating one or a plurality of compounds of the plurality of compounds, a measurement execution file creation unit configured to read out a measurement condition of the one or plurality of compounds from the compound database, and to create a measurement execution file in which the measurement condition of the one or plurality of compounds is described, and a measurement execution unit configured to execute measurement based on the measurement condition described in the measurement execution file.

The chromatograph mass spectrometer of the fourteenth aspect is useful when the sample containing the known compound is measured after the type of the separation unit or the mobile phase of the chromatograph is changed and the separation characteristics of the liquid chromatograph are confirmed by confirming the retention time of these compounds.

(Fifteenth Aspect)

According to a chromatograph mass spectrometer of a fifteenth aspect of the present invention, the chromatograph mass spectrometer according to any of the first aspect to the fourteenth aspect further includes a delay time storage unit configured to store a time at which the measurement data of the component is acquired in the first detector and information on a delay time which is a shift in time at which the mass spectrometry data of the component is acquired in the mass spectrometer.

The representative time of the peak is a time corrected based on the delay time.

In the chromatograph mass spectrometer of the fifteenth aspect, since the acquisition time of the mass spectrometry data is corrected, the time consistency with the chromatogram created based on the measurement data of the first detector is improved, and the information on the mass spectrometry data is easily grasped on the UV chromatogram.

(Sixteenth Aspect)

According to a chromatograph mass spectrometer of a sixteenth aspect of the present invention, in the chromatograph mass spectrometer according to any of the first aspect to the fifteenth aspect, the chromatogram creation unit further creates a chromatogram representing the intensity change of the mass spectrometry data with time, and the chromatogram display unit displays both a chromatogram representing a change in the measurement data of the first detector and a chromatogram representing the intensity change of the mass spectrometry data.

In the chromatograph mass spectrometer of the sixteenth aspect, even in the compound not detected by the first detector or the compound from which the measurement data having a sufficient intensity cannot be obtained, the compound can be quantified from the chromatograph based on the mass spectrometry measurement data.

(Seventeenth Aspect)

According to a chromatograph mass spectrometer of a seventeenth aspect of the present invention, in the chromatograph mass spectrometer according to any of the first aspect to the sixteenth aspect, the first detector is an ultraviolet-visible absorbance detector, a photodiode array detector, a spectrofluorescence detector, or a differential refractive index detector, and an ionization method of the mass spectrometer is any of an electrospray ionization method or an atmospheric pressure chemical ionization method.

In the chromatograph mass spectrometer of the seventeenth aspect, while the data is acquired by the ultraviolet-visible absorbance detector, the photodiode array detector, the spectrofluorescence detector, or the differential refractive index detector which is often used particularly in the liquid chromatograph, the chromatogram of the first detector can be displayed together with the additional information acquired by measuring the mass spectrometry data of the component that cannot be detected by these detectors but can be ionized by an ESI method or an APCI method.

REFERENCE SIGNS LIST

1 . . . Liquid Chromatograph
10 . . . Mobile Phase Container
11 . . . Pump
12 . . . Injector
13 . . . Column
14 . . . Autosampler
15 . . . UV Detector
151 . . . Flow Cell
152 . . . UV Lamp
153 . . . UV Detection Element
2 . . . Mass Spectrometer
20 . . . Ionization Room
201 . . . ESI Probe
202 . . . Heated Capillary
21 . . . First Intermediate Vacuum Room
211 . . . Ion Guide
212 . . . Skimmer
22 . . . Second Intermediate Vacuum Room
23 . . . Analysis Room
231 . . . Quadrupole Mass Filter
232 . . . Ion Detector
4 . . . Control Unit
41 . . . Storage Unit
411 . . . Compound Database
412 . . . Excluded Ion Storage Unit
413 . . . Delay Time Storage Unit
42 . . . Measurement Condition Setting Unit
421 . . . MS Scan Condition Input Reception Unit
422 . . . SIM Condition Input Reception Unit
43 . . . Measurement Execution File Creation Unit
44 . . . Measurement Execution Unit
45 . . . Chromatogram Creation Unit
46 . . . Information Extraction Unit
461 . . . Elution Time Extraction Unit
462 . . . Mass-to-charge Ratio Extraction Unit
463 . . . Co-elution Information Extraction Unit
47 . . . Component Identification Unit
48 . . . Chromatogram Display Unit
6 . . . Input Unit
7 . . . Display Unit

The invention claimed is:

1. A chromatograph mass spectrometer comprising:
a component separation unit configured to temporally separate components in a sample;
a first detector configured to acquire measurement data of components included in an outflowing liquid from the component separation unit by an analysis method different from mass spectrometry;
a mass spectrometer configured to acquire mass spectrometry data including intensity information for each of mass-to-charge ratios of ions derived from the components contained in the outflowing liquid from the component separation unit;
a chromatogram creation unit configured to create a chromatogram representing an intensity change of the measurement data with time based on the measurement data of the first detector;
an information extraction unit configured to detect a peak based on the intensity change of the mass spectrometry data with time, and to extract information including a representative time of the peak; and
a chromatogram display unit configured to display the chromatograph together with additional information corresponding to the extracted time.

2. The chromatograph mass spectrometer according to claim 1, wherein the chromatogram display unit displays the additional information at a position on the chromatogram corresponding to the representative time of the peak detected by the information extraction unit.

3. The chromatograph mass spectrometer according to claim 1, wherein
the information extraction unit further determines whether or not there is a peak at a position on the chromatogram created based on the measurement data of the first detector that corresponds to a time at which the peak is detected, and
the chromatogram display unit further adds, to the additional information, information indicating that there is no peak in the measurement data of the first detector at the time at which the peak is detected when it is determined that there is no peak by the information extraction unit.

4. The chromatograph mass spectrometer according to claim 1, wherein the representative time of the peak is a time at which an intensity of the mass spectrometry data is maximum or a time corresponding to a center of gravity of the peak.

5. The chromatograph mass spectrometer according to claim 1, wherein the intensity change of the mass spectrometry data with time is a time-series intensity change of an addition intensity obtained by adding an intensity in an entire measured mass-to-charge ratio range or a predetermined mass-to-charge ratio range.

6. The chromatograph mass spectrometer according to claim 5, further comprising:
an excluded ion storage unit configured to store information on a mass-to-charge ratio of an excluded ion which is not added to the addition intensity,
wherein the addition intensity is an intensity value excluding an ion intensity corresponding to the mass-to-charge ratio of the excluded ion.

7. The chromatograph mass spectrometer according to claim 1, wherein
the information extraction unit
extracts mass spectrum data from mass spectrometry data acquired at a plurality of points in time within a time range in which the peak is detected, detects a plurality of mass peaks from the mass spectrum data at each of the plurality of points in time, specifies a set of mass peaks in the mass spectrum data having intensity ratios common among the plurality of points in time, detects a time at which an intensity of at least one mass peak of the mass peaks included in the set is maximum, and sets the detected time as the representative time of the peak.

8. The chromatograph mass spectrometer according to claim 1, wherein the intensity change of the mass spectrometry data with time is a time-series intensity change of the mass spectrometry data measured for one or a plurality of individual mass-to-charge ratios.

9. The chromatograph mass spectrometer according to claim 1, wherein the information extraction unit further includes a mass-to-charge ratio extraction unit configured to extract a mass-to-charge ratio satisfying a predetermined condition from the mass spectrometry data measured at the extracted time, and additional information to be added to the chromatogram includes information related to the extracted mass-to-charge ratio.

10. The chromatograph mass spectrometer according to claim 9, wherein the mass-to-charge ratio satisfying the predetermined condition is a mass-to-charge ratio having an intensity exceeding a predetermined intensity threshold or a mass-to-charge ratio having a maximum intensity in the mass spectrometry data acquired at the extracted time.

11. The chromatograph mass spectrometer according to claim 9, wherein the information related to the mass-to-charge ratio includes at least one of a value of the mass-to-charge ratio, a molecular weight of a compound corresponding to the mass-to-charge ratio, a chemical formula, a structural formula, and a compound name.

12. The chromatograph mass spectrometer according to claim 1, further comprising:

a compound database configured to store mass spectrometry data for each of a plurality of compounds; and a component identification unit configured to identify the components contained in the outflowing liquid by collating the mass spectrometry data measured at the time extracted by the information extraction unit with the mass spectrometry data stored in the compound database, wherein the additional information includes information on the component identified by the component identification unit.

13. The chromatograph mass spectrometer according to claim 12, wherein the mass spectrometry data measured at the time extracted by the information extraction unit is a mass spectrum representing a relationship between a mass-to-charge ratio and an ion intensity.

14. The chromatograph mass spectrometer according to claim 12, wherein a measurement condition for measuring the mass spectrometry data of the plurality of compounds is stored in the compound database, and the chromatograph mass spectrometer further includes a compound input reception unit configured to receive an input of information for designating one or a plurality of compounds of the plurality of compounds, a measurement execution file creation unit configured to read out a measurement condition of the one or plurality of compounds from the compound database, and to create a measurement execution file in which the measurement condition of the one or plurality of compounds is described, and a measurement execution unit configured to execute measurement based on the measurement condition described in the measurement execution file.

15. The chromatograph mass spectrometer according to claim 1, further comprising:

a delay time storage unit configured to store a time at which the measurement data of the component is acquired in the first detector and information on a delay time which is a shift in time at which the mass spectrometry data of the component is acquired in the mass spectrometer, wherein the representative time of the peak is a time corrected based on the delay time.

16. The chromatograph mass spectrometer according to claim 1, wherein the chromatogram creation unit further creates a chromatogram representing the intensity change of the mass spectrometry data with time, and the chromatogram display unit displays both a chromatogram representing a change in the measurement data of the first detector and a chromatogram representing the intensity change of the mass spectrometry data.

17. The chromatograph mass spectrometer according to claim 1, wherein the first detector is an ultraviolet-visible absorbance detector, a photodiode array detector, a spectrofluorescence detector, or a differential refractive index detector, and an ionization method of the mass spectrometer is any of an electrospray ionization method or an atmospheric pressure chemical ionization method.

* * * * *